United States Patent
Patrickson et al.

(10) Patent No.: US 12,319,028 B2
(45) Date of Patent: Jun. 3, 2025

(54) LAMINATED GLAZING

(71) Applicant: Pilkington Group Limited, Lancashire (GB)

(72) Inventors: Charlie James Patrickson, Lancashire (GB); John Andrew Ridealgh, Lancashire (GB); Joseph Jeremy Boote, Lancashire (GB)

(73) Assignee: Pilkington Group Limited, Lancashire (GB)

( * ) Notice: Subject to any disclaimer, the term of this patent is extended or adjusted under 35 U.S.C. 154(b) by 661 days.

(21) Appl. No.: 16/632,050

(22) PCT Filed: Jul. 18, 2018

(86) PCT No.: PCT/GB2018/052033
§ 371 (c)(1),
(2) Date: Jan. 17, 2020

(87) PCT Pub. No.: WO2019/016548
PCT Pub. Date: Jan. 24, 2019

(65) Prior Publication Data
US 2020/0147935 A1     May 14, 2020

(30) Foreign Application Priority Data
Jul. 18, 2017   (GB) .................................... 1711553

(51) Int. Cl.
*B32B 15/04*     (2006.01)
*B32B 7/12*      (2006.01)
(Continued)

(52) U.S. Cl.
CPC .......... *B32B 17/10036* (2013.01); *B32B 7/12* (2013.01); *B32B 17/1011* (2013.01);
(Continued)

(58) Field of Classification Search
CPC ................................................ B32B 17/10036
(Continued)

(56) References Cited

U.S. PATENT DOCUMENTS 5,005,009 A * 4/1991 Roberts .............. G02B 27/0101
340/980
5,013,134 A   5/1991 Smith
(Continued)

FOREIGN PATENT DOCUMENTS

CN      105459509 A     4/2016
CN      106526854 A     3/2017
(Continued)

OTHER PUBLICATIONS

Office Action (Notice of Reasons for Refusal) issued Jun. 21, 2022, by the Japanese Patent Office in corresponding Japanese Patent Application No. 2020-502478 and an English Translation of the Office Action. (14 pages).
(Continued)

*Primary Examiner* — Lauren R Colgan
(74) *Attorney, Agent, or Firm* — BUCHANAN INGERSOLL ROONEY PC

(57) ABSTRACT

A laminated glazing for use as a combiner in a head up display comprises first and second glazing panes with at least one adhesive ply and an infrared reflecting film therebetween. Light incident upon the first glazing pane at an angle of incidence of 60° is reflected off the laminated glazing to produce first, second and third reflections, the third reflection being from light reflected from the infrared reflecting film. The laminated glazing further comprises light intensity reducing means between the first and second glazing panes for reducing the intensity of the third reflection. In an aspect, upon directing a beam of electromagnetic radiation having an intensity $I_o$ at 770 nm toward the first
(Continued)

pane of glazing material at an angle of incidence of 60°, the intensity of the third reflection at a wavelength of 770 nm is less than or equal to $0.185 \times I_o$.

16 Claims, 5 Drawing Sheets

(51) Int. Cl.
*B32B 17/06* (2006.01)
*B32B 17/10* (2006.01)
*B32B 27/30* (2006.01)
*B60K 35/00* (2006.01)
*C03C 17/36* (2006.01)
*G02B 5/20* (2006.01)
*G02B 5/26* (2006.01)
*G02B 27/01* (2006.01)
*B60K 35/23* (2024.01)

(52) U.S. Cl.
CPC .. *B32B 17/10201* (2013.01); *B32B 17/10229* (2013.01); *B32B 17/10761* (2013.01); *B32B 17/10788* (2013.01); *B32B 27/30* (2013.01); *B60K 35/00* (2013.01); *C03C 17/3618* (2013.01); *C03C 17/3639* (2013.01); *C03C 17/3644* (2013.01); *C03C 17/3649* (2013.01); *C03C 17/366* (2013.01); *C03C 17/3681* (2013.01); *G02B 5/208* (2013.01); *G02B 5/26* (2013.01); *G02B 27/0101* (2013.01); *B32B 27/306* (2013.01); *B32B 2255/205* (2013.01); *B32B 2255/28* (2013.01); *B32B 2307/416* (2013.01); *B32B 2315/08* (2013.01); *B32B 2329/06* (2013.01); *B32B 2331/04* (2013.01); *B32B 2551/00* (2013.01); *B32B 2605/08* (2013.01); *B60K 35/23* (2024.01); *G02B 2027/012* (2013.01); *G02B 2027/0194* (2013.01)

(58) Field of Classification Search
USPC .................................. 428/428, 437, 432, 434
See application file for complete search history.

(56) References Cited

U.S. PATENT DOCUMENTS

| | | | |
|---|---|---|---|
| 5,128,659 A | 7/1992 | Roberts et al. | |
| 5,279,722 A | 1/1994 | Szczyrbowski et al. | |
| 5,817,587 A * | 10/1998 | Jeanvoine | C03C 3/087 428/441 |
| 7,791,807 B2 * | 9/2010 | Pasca | G02B 27/0101 359/630 |
| 10,175,480 B2 * | 1/2019 | Zhao | H04N 9/3185 |
| 10,414,130 B2 * | 9/2019 | Ohmoto | G02B 5/282 |
| 10,668,790 B2 * | 6/2020 | Chen | G02B 1/14 |
| 10,828,872 B2 * | 11/2020 | Schulz | B32B 17/10761 |
| 11,128,636 B1 * | 9/2021 | Jorasch | A61B 5/369 |
| 2002/0086141 A1 * | 7/2002 | Sauer | B32B 17/10761 428/156 |
| 2004/0209757 A1 * | 10/2004 | Landa | C03C 3/095 501/64 |
| 2004/0219368 A1 * | 11/2004 | Coster | B32B 17/10036 428/432 |
| 2005/0123772 A1 | 6/2005 | Coustet et al. | |
| 2006/0182980 A1 * | 8/2006 | Barton | C03C 4/02 501/71 |
| 2008/0199670 A1 * | 8/2008 | Yaoita | C03C 17/3435 428/213 |
| 2008/0285134 A1 * | 11/2008 | Closset | B32B 17/1055 359/601 |
| 2009/0219468 A1 * | 9/2009 | Barton | B32B 17/10541 359/359 |
| 2009/0237782 A1 * | 9/2009 | Takamatsu | C03C 17/3417 359/359 |
| 2009/0303604 A1 * | 12/2009 | Martin | B32B 17/10174 427/163.1 |
| 2011/0300356 A1 * | 12/2011 | Takamatsu | B32B 17/10633 428/212 |
| 2013/0344321 A1 | 12/2013 | Mcsporran et al. | |
| 2014/0017472 A1 | 1/2014 | Coster et al. | |
| 2014/0104690 A1 | 4/2014 | Sandre-Chardonnal | |
| 2014/0362434 A1 * | 12/2014 | Schmitz | B32B 17/10761 427/125 |
| 2017/0050415 A1 | 2/2017 | Kanki | |
| 2017/0219818 A1 * | 8/2017 | Fang | G02B 5/3083 |
| 2017/0242247 A1 * | 8/2017 | Tso | B32B 17/10761 |
| 2017/0361579 A1 * | 12/2017 | Chen | B32B 27/365 |
| 2017/0363863 A1 * | 12/2017 | Chen | G02B 5/3083 |
| 2018/0281568 A1 | 10/2018 | Nakamura et al. | |
| 2019/0285882 A1 * | 9/2019 | Arndt | B60K 35/00 |
| 2021/0060905 A1 * | 3/2021 | Cintora Gonzalez | C03C 3/085 |
| 2021/0323409 A1 * | 10/2021 | Izutani | B32B 17/10036 |

FOREIGN PATENT DOCUMENTS

| | | |
|---|---|---|
| DE | 102013017697 A1 | 6/2014 |
| EP | 0448522 A2 | 9/1991 |
| EP | 2883847 A1 | 6/2015 |
| GB | 2537474 A | 10/2016 |
| JP | H02294615 A | 12/1990 |
| JP | 2004-051466 A | 2/2004 |
| JP | 2004-522677 A | 7/2004 |
| JP | 2008-537519 A | 9/2008 |
| JP | 2009-534245 A | 9/2009 |
| JP | 2014-509963 A | 4/2014 |
| WO | 0032530 A1 | 6/2000 |
| WO | 2007/122426 A1 | 11/2007 |
| WO | 2009001143 A1 | 12/2008 |
| WO | 2010035031 A1 | 4/2010 |
| WO | 2010073042 A1 | 7/2010 |
| WO | 2012007737 A1 | 1/2012 |
| WO | 2012052749 A1 | 4/2012 |
| WO | 2012110823 A1 | 8/2012 |
| WO | 2012143704 A1 | 10/2012 |
| WO | 2015052494 A1 | 4/2015 |
| WO | 2015056594 A1 | 4/2015 |
| WO | 2015122507 A1 | 8/2015 |
| WO | 2016/193669 A1 | 12/2016 |
| WO | 2017104632 | 6/2017 |

OTHER PUBLICATIONS

Bamford, C.R., in Glass Science and Technology, "Colour Control and Generation in Glass", Elsevier, 4 pages, 1977 (month unknown).
Finley, J.J., "Heat treatment and bending of low-E glass", Thin Solid Films, 351, pp. 264-273, 1999 (month unknown).
Great Britain Search Report dated Jan. 18, 2018, issued by the Great Britain Office in the corresponding European Patent Application No. GB1711553.6. (3 pages).
International Search Report (PCT/ISA/210) issued on Nov. 30, 2018, by the European Patent Office as the International Searching Authority for International Application No. PCT/GB2018/052033.
Written Opinion (PCT/ISA/237) issued on Nov. 30, 2018, by the European Patent Office as the International Searching Authority for International Application No. PCT/GB2018/052033.
Office Action (Notice of Reasons for Refusal) issued Mar. 28, 2023, by the Japanese Patent Office in corresponding Japanese Patent Application No. 2020-502478, English Translation only (5 pages).
Office Action (Notice of Reasons for Refusal) issued Nov. 28, 2023, by the Japanese Patent Office in corresponding Japanese Patent Application No. 2020-502478, English Translation only (6 pages).

\* cited by examiner

LAMINATED GLAZING

The present invention relates to a laminated glazing comprising at least two sheets of glazing material and at least one infrared reflecting coating therebetween, in particular a laminated vehicle glazing for use as a combiner in a head up display.

Head up display (HUD) systems for vehicles are well known. Typically a HUD has four basic parts, (i) a source of light, for displaying information to be shown to the driver of the vehicle, (ii) an electronic part comprising a microprocessor to process data and provide the information to be visualised, (iii) an optical system which carries the beam of light and focusses the image at a certain distance from the eyes of the driver, and (iv) a combiner which superimposes the image of the driving information on that of the outer environment.

It is known to use the windscreen of a vehicle as the combiner. A light source is configured for projection onto the inner facing surface of the windscreen (i.e. the surface facing the interior of the cabin of the vehicle) to be projected into the line of sight of the vehicle driver.

WO2010/035031A1 describes a laminated glazing for use as windscreen with a HUD. An example is provided with two curved plies of glass each having a thickness of 1.8 mm, tinted light green in colour with a light transmission (CIE Illuminant A) of 80%. A PVB interlayer is used to bond the two glass plies together to produce the laminate, the PVB interlayer being pre-shaped and unshaped fully and partially wedged.

It is well known that the use of wedged PVB in HUD systems for vehicle windscreens can reduce the amount of "ghosting" (or secondary image) that the driver of the vehicle observes. Such ghosting is due to the HUD light source being reflected from the air/glass interface at the inner surface of the windscreen to produce a primary image to be observed by the vehicle driver, and HUD light that is transmitted through the windscreen is reflected off the glass/air interface (the outer surface of the windscreen), also back towards the driver of the vehicle to produce a secondary image viewable by the vehicle drive, but slightly offset from the primary image. The wedged interlayer i.e. PVB reduces the spacing between the primary image and the secondary image, see for example U.S. Pat. No. 5,013,134.

It is known from GB2537474A to use a coating on the interior facing surface of a windscreen to provide said surface with more reflectivity at the wavelengths of light used by the narrow-band emitters used for the HUD light source compared to other wavelengths of the visible part of the spectrum.

EP0448522A2 describes a windshield for a motor vehicle that is provided with a transparent coating apt to simultaneously reduce the transmission of incident light energy and combine data relating to driving with the images of the outer environment. The transparent coating has the capacity of screening sun radiation and sorting information deriving from an apparatus of the head-up display type. Examples are provided where a clear glass sheet is coated with a multi-layer energy reflective coating, or where a layer of $TiO_2$ is deposited on the inner facing surface of a windshield formed by a clear glass with a thickness of 2.4 mm, an adhesive PVB layer of 0.76 mm and by a green glass with a thickness of 2.4 mm.

CN105459509A relates to a glass, and more particularly to a double-layer glass having better thermal insulation properties. A laminated glazing is described comprising an inner flat glass and an outer flat glass with an infrared reflecting layer and an infrared absorbing layer arranged between the inner flat glass and the outer flat glass. The infrared reflecting layer is located outside the infrared absorbing layer.

WO2015/056594A1 relates to an infrared shielding film and laminated glass in which colour unevenness is unlikely to occur. WO2015/056594A1 provides an infrared shielding film comprising a phase difference film having an in-plane retardation of 110-150 nm with respect to 550 nm wavelength light, and an infrared reflecting layer which is disposed on at least one surface of the phase difference film.

EP2883847A1 describes an interlayer film for laminated glass which is high in heat shielding properties.

In "Thin Solid Films, 351 (1999), p. 264-273 by J. J. Finley", in Table 1 thereof, reflectance and transmittance properties from a solar control windshield coating consisting of single and double stack coatings is provided.

A problem with a coated windscreen, where the infrared reflecting coating is between the glass plies of the laminate, is that in addition to the reflection of visible light from the air/glass and glass/air interfaces, reflection of visible light off the infrared reflecting coating is also possible because of the refractive index difference between one or more of the layers that form the infrared reflecting coating and the adjacent coating layer and/or glass and/or interlayer i.e. PVB.

As a consequence of this additional reflection, when such a coated windscreen is used as a HUD combiner in a vehicle, in addition to the primary and secondary reflections described above for a windscreen not having an infrared reflecting coating between the glass plies, there is also a third reflection due to the reflection of the HUD light source off the infrared reflecting coating.

This additional third (or tertiary) reflection gives rise to another "ghost" image perceived by the driver. Unfortunately whilst it may be possible to use a wedge interlayer between the glass plies of the windscreen to bring either the second or third reflection into alignment with the primary reflection (depending upon which surface of the plies forming the laminate the coating is on), it is not possible to bring both the second and third reflections into alignment with the primary reflection.

This problem of an additional ghost image is described in DE102013017697A1 where the spectral distribution of the image light source for projection onto the windscreen is chosen to approximately assume the lowest reflectance value of the coating to reduce the intensity of the reflected image off the coating so it is no longer perceived by the human eye.

It is described in U.S. Pat. Nos. 5,005,009 and 5,128,659 to use an absorber or blocker of selected light waves which match the light waves of a display of indicia projected against the interior side of a windscreen. The primary reflection is used to present information to the driver of the vehicle and the intensity of the secondary reflection is reduced due to the presence of the absorber, thereby reducing ghosting. A problem with this solution exists with multi-colour HUD systems where it may not be possible to reduce the ghosting at multiple different wavelengths by absorption without comprising the overall light transmittance of the windscreen. Furthermore in both U.S. Pat. Nos. 5,005,009 and 5,128,659 there isn't a coating between the plies of the windscreen.

There are however circumstances when it is desirable to have an infrared reflecting coating between the glass plies of a windscreen as suitable infrared reflecting coatings are also electrically conductive, so may be used to provide additional functionality to the windscreen, for example a heatable windscreen function whereby an electrical current may be passed through the infrared reflecting coating to enable the windscreen to be demisted or de-iced.

The present invention aims to at least partially overcome the problems discussed above.

Accordingly the present invention provides from a first aspect a laminated glazing for use as a combiner in a head up display, the laminated glazing comprising at least two (a first and a second) panes of glazing material joined by an interlayer structure comprising at least one adhesive ply, each of the first and second panes of glazing material having respectively a first major surface and an opposing second major surface, wherein the laminated glazing is configured such that the second major surface of the first pane of glazing material faces the first major surface of the second pane of glazing material, there being an infrared reflecting film between the first and second panes of glazing material, further wherein the first major surface of the first pane of glazing material is an exposed surface of the laminated glazing such that light directed towards the first major surface of the first pane of glazing material at an angle of incidence of 60° to a normal on the first major surface of the first pane of glazing material is reflected off the laminated glazing to produce a first reflection, a second reflection and a third reflection, the first reflection being from light reflected from the first major surface of the first pane of glazing material, the second reflection being from light reflected from the second major surface of the second pane of glazing material and the third reflection being from light reflected from the infrared reflecting film, characterised in that the laminated glazing comprises between the first major surface of the first pane of glazing material and the second major surface of the second pane of glazing material light intensity reducing means for reducing the intensity of the third reflection, such that upon directing a beam of electromagnetic radiation having an intensity $I_o$ at 770 nm toward the first major surface of the first pane of glazing material at an angle of incidence of 60° to a normal on the first major surface of the first pane of glazing material, the intensity of the third reflection at a wavelength of 770 nm is less than or equal to $0.185 \times I_o$.

It has been found by incorporating light intensity reducing means between the first major surface of the first pane of glazing material and the second major surface of the second pane of glazing material, the absolute intensity of the third reflection at 770 nm is lower compared to the same laminated glazing without having the light intensity reducing means between the first major surface of the first pane of glazing material and the second major surface of the second pane of glazing material.

The light intensity reducing means selectively reduces the intensity of the third reflection whilst still allowing suitably high visible light to be transmitted through the laminated glazing.

As is readily apparent, the beam of electromagnetic radiation that is directed toward the first major surface of the first pane of glazing material at an angle of incidence of 60° to a normal on the first major surface of the first pane of glazing material is typically referred to as an incident beam.

The intensity of the third reflection at a particular wavelength is the mean average of the third reflection at that wavelength under both p and s polarised electromagnetic radiation.

For the avoidance of doubt, the laminated glazing is configured such that the second major surface of the first pane of glazing material and the first major surface of the second pane of glazing material both face the infrared reflecting film.

For the avoidance of doubt, the laminated glazing is configured such that the second major surface of the first pane of glazing material and the first major surface of the second pane of glazing material both face the at least one adhesive ply.

As is known in the art, a pane of glazing material is often referred to as a ply of glazing material or a sheet of glazing material.

Preferably the light intensity reducing means is between the first major surface of the first pane of glazing material and the infrared reflecting film.

Preferably the light intensity reducing means comprises light absorbing means.

Preferably the beam of electromagnetic radiation has an intensity $I_o$ at a wavelength of 770 nm and the intensity of the third reflection at 770 nm is less than or equal to $I_{770}$ where $I_{770}=0.18 \times I_o$ or where $I_{770}=0.17 \times I_o$ or where $I_{770}=0.16 \times I_o$ or where $I_{770}=0.15 \times I_o$ or where $I_{770}=0.14 \times I_o$ or where $I_{770}=0.13 \times I_o$ or where $I_{770}=0.12 \times I_o$.

Suitably the intensity of the third reflection at 770 nm is greater than or equal to $0.01 \times I_o$ when the incident beam of electromagnetic radiation has an intensity $I_o$ at a wavelength of 770 nm.

Preferably the beam of electromagnetic radiation has an intensity $I_o$ at a wavelength of 660 nm and the intensity of the third reflection at 660 nm is less than or equal to $0.13 \times I_o$.

When the beam of electromagnetic radiation has an intensity $I_o$ at a wavelength of 660 nm, preferably the intensity of the third reflection at 660 nm is less than or equal to 1660 where $I_{660}=0.12 \times I_o$ or where $I_{660}=0.11 \times I_o$ or where $I_{660}=0.1 \times I_o$ or where $I_{660}=0.09 \times I_o$ or where $I_{660}=0.08 \times I_o$ or where $I_{660}=0.07 \times I_o$ or where $I_{660}=0.06 \times I_o$ or where $I_{660}=0.05 \times I_o$ or where $I_{660}=0.04 \times I_o$.

Suitably the intensity of the third reflection at 660 nm is greater than or equal to $0.005 \times I_o$ when the incident beam of electromagnetic radiation has an intensity $I_o$ at a wavelength of 660 nm.

Preferably the beam of electromagnetic radiation has an intensity $I_o$ at a wavelength of 750 nm and the intensity of the third reflection at 750 nm is less than or equal to $0.17 \times I_o$.

When the beam of electromagnetic radiation has an intensity $I_o$ at a wavelength of 750 nm, preferably the intensity of the third reflection at 750 nm is less than or equal to $I_{750}$ where $I_{750}=0.16 \times I_o$ or where $I_{750=0.15} \times I_o$ or where $I_{750}=0.14 \times I_o$ or where $I_{750}=0.13 \times I_o$ or where $I_{750}=0.12 \times I_o$ or where $I_{750}=0.11 \times I_o$ or where $I_{750}=0.10 \times I_o$.

Suitably the intensity of the third reflection at 750 nm is greater than or equal to $0.005 \times I_o$ when the incident beam of electromagnetic radiation has an intensity $I_o$ at a wavelength of 750 nm.

In some embodiments light intensity reducing means is provided by the first pane of glazing material.

Preferably the first pane of glazing material comprises absorbing means for reducing the intensity of the third reflection.

Preferably the first pane of glazing material comprises glass, more preferably soda-lime-silica glass. A typical soda-lime-silica glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2%; $Fe_2O_3$ 0.005-2%. The glass composition may also contain other additives, for example, refining aids, which would normally be present in an amount of up to 2%.

Preferably the first pane of glazing material is a sheet of glass, in particular soda-lime-silica glass, comprising a colourant portion comprising iron oxide ($Fe_2O_3$). Preferably the level of iron oxide in the glass composition of the first pane of glazing material is between 0.15% and 2% by weight $Fe_2O_3$, more preferably between 0.2% and 1.5% by weight $Fe_2O_3$.

In some embodiments the first pane of glazing material comprises a coating on the second major surface thereof, and the coating comprises at least one light absorbing layer for reducing the intensity of the third reflection. The coating on the second major surface of the first pane of glazing material may be part of the infrared reflecting film, or separate thereto.

Preferably the at least one light absorbing layer of the coating on the second major surface of the first pane of glazing material has a thickness between 0.1 nm and 5 nm, more preferably 0.1 nm and 3 nm, even more preferably 0.2 nm and 2.5 nm.

Preferably the at least one light absorbing layer of the coating on the second major surface of the first pane of glazing material comprises nichrome or an oxide or nitride of nichrome These oxides or nitrides of nichrome may be stoichiometric, sub-stoichiometric or super-stoichiometric.

In some embodiments light intensity reducing means is provided by the second pane of glazing material.

Preferably the second pane of glazing material comprises absorbing means for reducing the intensity of the third reflection.

Preferably the second pane of glazing material comprises glass, more preferably soda-lime-silica glass.

Preferably the second pane of glazing material is a sheet of glass, in particular soda-lime-silica glass, comprising a colourant portion including iron oxide ($Fe_2O_3$). Preferably the level of iron oxide in the glass composition of the second pane of glazing material is between 0.15% and 2% by weight $Fe_2O_3$, more preferably between 0.2% and 1.5% by weight $Fe_2O_3$.

In some embodiments the second pane of glazing material comprises a coating on the first major surface thereof, and the coating comprises at least one optical absorbing layer for reducing the intensity of the third reflection. The coating on the first major surface of the second pane of glazing material may be part of the infrared reflecting film, or separate thereto.

Preferably the at least one light absorbing layer of the coating on the first major surface of the second pane of glazing material has a thickness between 0.1 nm and 5 nm, more preferably between 0.1 nm and 3 nm, even more preferably between 0.2 nm and 2.5 nm.

Preferably the at least one light absorbing layer of the coating on the first major surface of the second pane of glazing material comprises nichrome or an oxide or nitride of nichrome These oxides or nitrides of nichrome may be stoichiometric, sub-stoichiometric or super-stoichiometric.

In some embodiments the second pane of glazing material has a higher transmission to visible light than the first pane of glazing material. The light transmission may be calculated according to CIE Illuminant C 10 degree observer.

In some embodiments the second pane of glazing material comprises a sheet of soda-lime-silica glass having an iron oxide content between 0.001% and 0.19% by weight $Fe_2O_3$, preferably between 0.001% and 0.12% by weight $Fe_2O_3$, preferably between 0.001% and 0.1% by weight $Fe_2O_3$. By using a second pane of glazing material with a high visible light transmission and high infrared transmission, the infrared reflecting film is able to reflect solar radiation away from the first pane of glazing material and/or the interlayer structure. This helps reduce the amount of solar radiation that may be absorbed by the first pane of glazing material and/or the interlayer structure, thereby helping reduce the amount of heat transmitted away from the first pane of glazing material i.e. into the vehicle interior when the laminated glazing is installed in the vehicle with the first major surface of the first pane of glazing material facing the vehicle interior.

In some embodiments the first and/or second pane of glazing material is a glass sheet comprising more iron oxide ($Fe_2O_3$ expressed as a percentage by weight) than clear float glass. By clear float glass, it is meant a glass having a composition as defined in BS EN 572 1 and BS EN 572-2 (2012).

For clear float glass, the $Fe_2O_3$ level by weight is typically 0.11%. Float glass with an $Fe_2O_3$ content less than this level is typically referred to as low iron float glass. Such glass usually has the same basic composition of the other component oxides i.e. low iron float glass is also a soda-lime-silicate glass, as is clear float glass.

A low iron float glass is usually made by using low iron containing raw materials. Typically low iron containing float glass contains between 0.001% and 0.07% by weight $Fe_2O_3$.

When $Fe_2O_3$ is present in a glass, it can exist in two oxidation states, namely ferrous iron ($Fe^{2+}$) and ferric iron ($Fe^{3+}$). The total iron oxide $Fe_2O_3$ content of a glass is usually quoted in terms of $Fe_2O_3$ only, and the ratio of ferrous iron to ferric iron is quoted as a percentage of the total $Fe_2O_3$.

It is possible to determine ferrous iron by chemical techniques, although for low iron containing glass, the level of ferrous iron is low making other techniques more suitable. One such technique is to measure the absorption of the glass at 1000 nm, as this is in the region of the peak absorption due to ferrous iron. It is then possible to determine the ferrous iron content using the well-known Lambert-beer law and an appropriate extinction coefficient for ferrous iron. A method of optically determining the amount of ratio of ferrous iron to ferric iron in glass is described by C. R. Bamford in "Colour Control and Generation in Glass", Elsevier (1977).

In some embodiments the first glazing pane has a lower transmission to visible light than the second glazing pane. This may be achieved by the first glazing pane and the second glazing pane having the same composition, but where the second glazing pane is thinner than the first glazing pane. Alternatively for equivalent thickness, the first glazing pane has a lower visible light transmission compared to the second glazing pane due to higher levels of colourants, in particular iron oxide, in the first glazing pane compared to the second glazing pane.

In some embodiments the light intensity reducing means for reducing the intensity of the third reflection comprises a further light absorbing glass sheet comprising one or more optical absorbers.

Preferably at least one of the optical absorbers of the further light absorbing glass sheet is iron oxide ($Fe_2O_3$).

Preferably the iron oxide content of the further light absorbing glass sheet is between 0.001% and 2% by weight $Fe_2O_3$, preferably between 0.05% and 1% by weight $Fe_2O_3$.

When the laminated glazing comprises a further light absorbing glass sheet, suitably the further light absorbing glass sheet is joined to the first pane of glazing material via at least one adhesive ply and the further light absorbing glass sheet is joined to the second pane of glazing material via at least one adhesive ply In some embodiments the light intensity reducing means for reducing the intensity of the third reflection comprises a tinted interlayer material. This may be a tinted interlayer specifically included in the laminated glazing to reduce the intensity of the third reflection or may have one or more property serving other functions, for example acoustic dampening and/or being wedged.

In some embodiments the at least one adhesive ply comprises a tinted interlayer material.

In some embodiments the infrared reflecting film comprises at least one layer comprising silver. Preferably the thickness of the at least one layer comprising silver is between 1 and 20 nm, more preferably between 5 and 15 nm.

Preferably the infrared reflecting film comprises at least one layer of silver, preferably wherein the thickness of the at least one layer of silver is between 1 and 20 nm, more preferably between 5 and 15 nm.

Preferably the infrared reflecting film comprises at least two layers, each of the at least two layers comprising silver.

Preferably the infrared reflecting film comprises at least three layers, each of the at least three layers comprising silver.

In some embodiments the light intensity reducing means for reducing the intensity of the third reflection comprises a light absorbing coating layer.

Preferably the infrared reflecting film comprises the light absorbing coating layer.

Preferably the light absorbing coating layer is on the second major surface of the first sheet of glazing material.

Preferably the light absorbing coating layer is on the first major surface of the second pane of glazing material.

Preferably the light absorbing coating layer comprises nichrome or an oxide or nitride of nichrome. These oxides or nitrides of nichrome may be stoichiometric, sub-stoichiometric or super-stoichiometric.

Preferably the light absorbing coating layer has a thickness between 0.1 nm and 5 nm, more preferably between 0.1 nm and 3 nm, even more preferably between 0.2 nm and 2.5 nm.

Methods to deposit such layers are known to a person skilled in the art, and are described in the prior art, for example in U.S. Pat. No. 5,279,722, WO0032530A1, WO2009001443A1, WO2012110823A1, WO2012143704A1, WO2012052749A1 and WO2015052494A1

In some embodiments the infrared reflecting film is on the second major surface of the first pane of glazing material.

For the avoidance of doubt, when the infrared reflecting film is on the second major surface of the first pane of glazing material the infrared reflecting film may be in direct contact with the second major surface of the first pane of glazing material.

In some embodiments the infrared reflecting film is on the first major surface of the second pane of glazing material.

For the avoidance of doubt, when the infrared reflecting film is on the first major surface of the second pane of glazing material the infrared reflecting film may be in direct contact with the first major surface of the second pane of glazing material.

In some embodiments the infrared reflecting film is on a carrier ply, the carrier ply not being the first or second panes of glazing material.

The carrier ply may comprise glass, in particular soda-lime-silica glass.

Preferably the carrier ply comprises a plastic material, in particular polyethylene, especially polyethylene terephthalate (PET).

When the infrared reflecting film is on a carrier ply, preferably the carrier ply is positioned between a first and a second adhesive ply, the first adhesive ply being between the first pane of glazing material and the carrier ply and the second adhesive ply being between the second pane of glazing material and the carrier ply.

Preferably the carrier ply is positioned in a cut-out region in an adhesive ply. Preferably the adhesive ply with the cut-out region therein is positioned between first and second adhesive plies.

Embodiments of the first aspect of the present invention have other preferable features.

Preferably the first and/or second pane of glazing material is body tinted.

Preferably the thickness of the infrared reflecting film is between 100 nm and 300 nm, more preferably between 150 nm and 250 nm, even more preferably between 160 nm and 200 nm.

Preferably the infrared reflecting film is a multilayer coating comprising at least one metal layer, in particular at least one silver layer.

Preferably the infrared reflecting film comprises at least one layer of ZnSnOx, ZnO or ZnO:Al, where ZnO:Al is ZnO doped with $Al_2O_3$, typically at a level of about 3 wt % $Al_2O_3$.

Preferably the infrared reflecting film comprises at least one layer of ZnSnOx spaced apart from the first or second pane of glazing material by at least one layer of silver. The at least one ZnSnOx layer may be deposited by reactive sputtering from an approximately 50/50 wt % Zn:Sn target.

Preferably the infrared reflecting film comprises a first layer in direct contact with the first or second pane of glazing material, preferably wherein the first layer is ZnSnOx, ZnO or ZnO:Al, where ZnO:Al is ZnO doped with $Al_2O_3$, typically at a level of about 3 wt % $Al_2O_3$.

Preferably the infrared reflecting film comprises at least a first layer comprising silver in between a first layer of ZnSnOx, ZnO or ZnO:Al and a second layer of ZnSnOx, ZnO or ZnO:Al, preferably wherein the first layer of ZnSnOx, ZnO or ZnO:Al is in direct contact with the first or second pane of glazing material, where ZnO:Al is ZnO doped with $Al_2O_3$, typically at a level of about 3 wt % $Al_2O_3$.

Preferably the infrared reflecting film comprises a first layer comprising silver and a second layer comprising silver, the first layer comprising silver being between a first layer of ZnSnOx, ZnO or ZnO:Al and a second layer of ZnSnOx, ZnO or ZnO:Al, the first layer of ZnSnOx, ZnO or ZnO:Al preferably being in direct contact with the first or second pane of glazing material; and the second layer comprising silver being between the second layer of ZnSnOx, ZnO or ZnO:Al and a third layer of ZnSnOx, ZnO or ZnO:Al, where ZnO:Al is ZnO doped with $Al_2O_3$, typically at a level of about 3 wt % $Al_2O_3$.

Preferably the infrared reflecting film comprises a first layer in direct contact with the first or second pane of glazing material, the first layer being ZnSnOx and having a thickness between 25 nm and 32 nm, Preferably the infrared reflecting film comprises a first layer of ZnSnOx having a thickness between 25 nm and 32 nm and being in direct contact with the first or second pane of glazing material, wherein the infrared reflecting film further comprises a layer of ZnOx having a thickness less than 7 nm on the first layer of ZnSnOx.

Preferably the infrared reflecting film comprises a first layer of ZnSnOx having a thickness between 25 nm and 32 nm and being in direct contact with the first or second pane of glazing material, wherein the infrared reflecting film further comprises a second layer of ZnSnOx having a thickness between 75 nm and 85 nm and at least one layer of silver between the first and second layers of ZnSnOx, preferably wherein the at least one layer of silver has a thickness between 8 nm and 13 nm.

Preferably the infrared reflecting film comprises a first layer of ZnSnOx having a thickness between 25 nm and 32 nm and being in direct contact with the first or second pane of glazing material, a second layer of ZnSnOx having a thickness between 75 nm and 85 nm, and a layer of silver preferably having a thickness between 7 nm and 13 nm between the first and second layers of ZnSnOx, wherein the infrared reflecting film further comprises a third layer of ZnSnOx preferably having a thickness between 30 nm and 45 nm and another layer of silver between the second and third layers of ZnSnOx, the another layer of silver preferably having a thickness between 7 nm and 15 nm.

Preferably the infrared reflecting film comprises a first layer in direct contact with the first or second pane of glazing material, the first layer being ZnO or ZnO:Al and preferably having a thickness between 30 nm and 40 nm, where ZnO:Al is ZnO doped with $Al_2O_3$, typically at a level of about 3 wt % $Al_2O_3$.

Preferably the infrared reflecting film comprises a first layer in direct contact with the first or second pane of glazing material, the first layer being ZnO or ZnO:Al and preferably having a thickness between 30 nm and 40 nm, wherein the infrared reflecting film further comprises a second layer of ZnO or ZnO:Al with at least one layer of silver therebetween, the second layer of ZnO or ZnO:Al preferably having a thickness between 75 nm and 85 nm and the at least one layer of silver preferably having a thickness between 7 nm and 13 nm, where ZnO:Al is ZnO doped with $Al_2O_3$, typically at a level of about 3 wt % $Al_2O_3$.

Preferably the infrared reflecting film comprises a layer of SiOx and at least one layer comprising silver, the at least one layer comprising silver being between the first or second pane of glazing material and the layer of SiOx, more preferably wherein the layer of SiOx is an outermost layer of the infrared reflecting film. The layer of SiOx may be deposited using a Si target containing up to 30 wt % $Al_2O_3$ so depositing an SiOx:Al layer, wherein said layer may containing up to 15 wt % $Al_2O_3$.

Preferably the at least one adhesive ply comprises polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the at least one adhesive ply has a thickness between 0.3 mm and 2.3 mm, preferably between 0.3 mm and 1.6 mm, more preferably between 0.3 mm and 0.9 mm.

Preferably the interlayer structure comprises at least two adhesive plies.

Preferably the interlayer structure comprises at least two adhesive plies spaced apart from one another.

Preferably the interlayer structure has less than twenty adhesive plies, more preferably less than ten adhesive plies, even more preferably less than five adhesive plies.

Preferably the interlayer structure has only one adhesive ply or only two adhesive plies or only three adhesive plies.

Preferably at normal incidence the laminated glazing has a visible light transmission (CIE Illuminant A 10 degree observer) of greater than 70% or 71% or 72% or 73% or 74% or 75%, more preferably between 70% and 80%.

Preferably at normal incidence the laminated glazing has a total transmitted solar (TTS %) measured using ISO 13837:2008 Convention A (with outside surface wind velocity $v_1$ of approximately 4 m/s) of less than 60%, more preferably less than 55%, even more preferably less than 50%.

Preferably at normal incidence the percentage of light reflected from the second major surface of the second pane of glazing material (CIE Illuminant D65 10 degree) observer is less than 12%, preferably less than 11%, more preferably less than 10%.

Preferably at normal incidence the light reflected from the second major surface of the second pane of glazing material (CIE Illuminant D65 10 degree observer) has an a* less than or equal to zero, preferably between −10 and zero.

Preferably at normal incidence the light reflected from the second major surface of the second pane of glazing material (CIE Illuminant D65 10 degree observer) has a b* less than or equal to zero, preferably between −15 and zero, more preferably between −10 and zero.

Preferably the first pane of glazing material and the second pane of glazing material are not parallel to one another. By spacing the first and second glazing panes such that they are not parallel to one another, the second or third reflection may be displaced to be coincident with, or substantially coincident with, the first reflection. This may conveniently be achieved by using a wedge shaped interlayer between the first and second glazing panes. Preferably the second reflection is displaced to be coincident with, or substantially coincident with, the first reflection by using a wedge shaped interlayer in between the first and second panes of glazing material.

Preferably the second major surface of the first glazing pane is a concave surface and the second major surface of the second glazing pane is an opposing convex surface.

Preferably the thickness of the first and/or second pane of glazing material is between 1 mm and 4 mm, preferably between 1.5 mm and 2.5 mm.

Preferably the thickness of the laminated glazing is between 3 mm and 10 mm.

Preferably the laminated glazing is curved in at least one direction. Preferably the radius of curvature in the at least one direction is between 500 mm and 20000 mm, more preferably between 1000 mm and 8000 mm.

Preferably the first pane of glazing material is a chemically strengthened glass pane and the second pane of glazing material is a sheet of soda-lime-silica glass.

Preferably prior to being incorporated into the laminated glazing, the infrared reflecting film is on the first or second sheet of glazing material and the sheet resistance ($\Omega/\square$) of the infrared reflecting film is between $2\Omega/\square$ and $4\Omega/\square$, more preferably between $2.5\Omega/\square$ and $3.5\ \Omega/\square$.

Preferably in the laminated glazing, the infrared reflecting film is on the second major surface of the first sheet of glazing material and the sheet resistance ($\Omega/\square$) of the infrared reflecting film is between $2\Omega/\square$ and $4\Omega/\square$, more preferably between $2.5\Omega/\square$ and $3.5\ \Omega/\square$.

Preferably in the laminated glazing, the infrared reflecting film is on the first major surface of the second sheet of glazing material and the sheet resistance ($\Omega/\square$) of the infrared reflecting film is between $2\Omega/\square$ and $4\Omega/\square$, more preferably between $2.5\Omega/\square$ and $3.5\ \Omega/\square$.

Preferably the laminated glazing is a vehicle windscreen.

From a second aspect the present invention provides use of one or more optical absorber for reducing the intensity of a third reflection produced by a laminated glazing when an incident beam of light strikes an exposed surface of a laminated glazing, the laminated glazing comprising at least two (a first and a second) panes of glazing material joined by an interlayer structure comprising at least one adhesive ply, each of the first and second panes of glazing material having respectively a first major surface and an opposing major surface, the laminated glazing being configured such that the second major surface of the first pane of glazing material faces the first major surface of the second pane of glazing material, there being an infrared reflecting film between the first and second panes of glazing material, wherein the first major surface of the first pane of glazing material is the exposed surface of the laminated glazing such that the beam of light directed towards the first major surface of the first pane of glazing material at an angle of incidence is reflected off the laminated glazing to produce a first reflection, a second reflection and the third reflection, the first reflection being from light reflected from the first major surface of the first pane of glazing material, the second reflection being from light reflected from the second major surface of the second pane of glazing material and the third reflection being from light reflected from the infrared reflecting film, wherein the optical absorber is between the first major surface of the first pane of glazing material and the second major surface of the second pane of glazing material, further wherein the optical absorber is selected from the list consisting of a tinted interlayer ply, a body tinted glazing pane and a coating layer.

Preferably the laminated glazing is a vehicle windscreen.

Preferably the optical absorber is between the first major surface of the first pane of glazing material and the infrared reflecting film.

Preferably the tinted interlayer ply is an adhesive tinted interlayer ply, more preferably tinted PVB or tinted EVA. Preferably the adhesive tinted interlayer ply is the at least one adhesive ply.

Preferably the tinted interlayer ply comprises PET.

Preferably the first pane of glazing material comprises the body tinted glazing pane.

Preferably the first pane of glazing material is the body tinted glazing pane.

Preferably the body tinted glazing pane comprises an iron oxide content between 0.15% and 2% by weight $Fe_2O_3$, more preferably between 0.2% and 1.5% by weight $Fe_2O_3$.

Preferably the body tinted glazing pane comprises soda-lime-silica glass.

Preferably the coating layer comprises nichrome or an oxide or nitride of nichrome. The oxides or nitrides of nichrome may be stoichiometric, sub-stoichiometric or super-stoichiometric.

Preferably the coating layer has a thickness between 0.1 nm and 5 nm, more preferably between 0.1 nm and 3 nm, even more preferably between 0.2 nm and 2.5 nm.

Preferably the optical absorber is used to reduce the intensity of the third reflection such that upon directing a beam of electromagnetic radiation having an intensity $I_o$ at 770 nm toward the first major surface of the first pane of glazing material at an angle of incidence of 60° to a normal on the first major surface of the first pane of glazing material, the intensity of the third reflection at a wavelength of 770 nm is less than or equal to $0.185 \times I_o$.

Preferably the optical absorber is used to reduce the intensity of the third reflection such that upon directing a beam of electromagnetic radiation having an intensity $I_o$ at 660 nm toward the first major surface of the first pane of glazing material at an angle of incidence of 60° to a normal on the first major surface of the first pane of glazing material, the intensity of the third reflection at a wavelength of 660 nm is less than or equal to $0.13 \times I_o$.

Preferably the optical absorber is used to reduce the intensity of the third reflection such that upon directing a beam of electromagnetic radiation having an intensity $I_o$ at 750 nm toward the first major surface of the first pane of glazing material at an angle of incidence of 60° to a normal on the first major surface of the first pane of glazing material, the intensity of the third reflection at a wavelength of 750 nm is less than or equal to $0.17 \times I_o$.

The optical absorber is used to reduce the absolute intensity of the third reflection at one or more wavelength.

Other embodiments of the second aspect of the present invention have other preferable features.

Preferably the thickness of the infrared reflecting film is between 100 nm and 300 nm, more preferably between 150 nm and 250 nm, even more preferably between 160 nm and 200 nm.

Preferably the infrared reflecting film is a multilayer coating comprising at least one metal layer, in particular at least one silver layer.

Preferably the infrared reflecting film comprises at least one layer of ZnSnOx, ZnO or ZnO:Al, where ZnO:Al is ZnO doped with $Al_2O_3$, typically at a level of about 3 wt % $Al_2O_3$.

Preferably the infrared reflecting film comprises at least one layer of ZnSnOx spaced apart from the first or second pane of glazing material by at least one layer of silver. The at least one ZnSnOx layer may be deposited by reactive sputtering from an approximately 50/50 wt % Zn: Sn target.

Preferably the infrared reflecting film comprises a first layer in direct contact with the first or second pane of glazing material, preferably wherein the first layer is ZnSnOx, ZnO or ZnO:Al, where ZnO:Al is ZnO doped with $Al_2O_3$, typically at a level of about 3 wt % $Al_2O_3$.

Preferably the infrared reflecting film comprises at least a first layer comprising silver in between a first layer of ZnSnOx, ZnO or ZnO:Al and a second layer of ZnSnOx, ZnO or ZnO:Al, preferably wherein the first layer of ZnSnOx, ZnO or ZnO:Al is in direct contact with the first or second pane of glazing material, where ZnO:Al is ZnO doped with $Al_2O_3$, typically at a level of about 3 wt % $Al_2O_3$.

Preferably the infrared reflecting film comprises a first layer comprising silver and a second layer comprising silver, the first layer comprising silver being between a first layer of ZnSnOx, ZnO or ZnO:Al and a second layer of ZnSnOx, ZnO or ZnO:Al, the first layer of ZnSnOx, ZnO or ZnO:Al preferably being in direct contact with the first or second pane of glazing material; and the second layer comprising silver being between the second layer of ZnSnOx, ZnO or ZnO:Al and a third layer of ZnSnOx, ZnO or ZnO:Al, where ZnO:Al is ZnO doped with $Al_2O_3$, typically at a level of about 3 wt % $Al_2O_3$.

Preferably the infrared reflecting film comprises a first layer in direct contact with the first or second pane of glazing material, the first layer being ZnSnOx and having a thickness between 25 nm and 32 nm, Preferably the infrared reflecting film comprises a first layer of ZnSnOx having a thickness between 25 nm and 32 nm and being in direct contact with the first or second pane of glazing material, wherein the infrared reflecting film further comprises a layer of ZnOx having a thickness less than 7 nm on the first layer of ZnSnOx.

Preferably the infrared reflecting film comprises a first layer of ZnSnOx having a thickness between 25 nm and 32 nm and being in direct contact with the first or second pane of glazing material, wherein the infrared reflecting film further comprises a second layer of ZnSnOx having a thickness between 75 nm and 85 nm and at least one layer of silver between the first and second layers of ZnSnOx, preferably wherein the at least one layer of silver has a thickness between 8 nm and 13 nm.

Preferably the infrared reflecting film comprises a first layer of ZnSnOx having a thickness between 25 nm and 32 nm and being in direct contact with the first or second pane of glazing material, a second layer of ZnSnOx having a thickness between 75 nm and 85 nm, and a layer of silver preferably having a thickness between 7 nm and 13 nm between the first and second layers of ZnSnOx, wherein the infrared reflecting film further comprises a third layer of ZnSnOx preferably having a thickness between 30 nm and 45 nm and another layer of silver between the second and third layers of ZnSnOx, the another layer of silver preferably having a thickness between 7 nm and 15 nm.

Preferably the infrared reflecting film comprises a first layer in direct contact with the first or second pane of glazing material, the first layer being ZnO or ZnO:Al and preferably having a thickness between 30 nm and 40 nm, where ZnO:Al is ZnO doped with $Al_2O_3$, typically at a level of about 3 wt % $Al_2O_3$.

Preferably the infrared reflecting film comprises a first layer in direct contact with the first or second pane of glazing material, the first layer being ZnO or ZnO:Al and preferably having a thickness between 30 nm and 40 nm, wherein the infrared reflecting film further comprises a second layer of ZnO or ZnO:Al with at least one layer of silver therebetween, the second layer of ZnO or ZnO:Al preferably having a thickness between 75 nm and 85 nm and the at least one layer of silver preferably having a thickness between 7 nm and 13 nm, where ZnO:Al is ZnO doped with $Al_2O_3$, typically at a level of about 3 wt % $Al_2O_3$.

Preferably the infrared reflecting film comprises a layer of SiOx and at least one layer comprising silver, the at least one layer comprising silver being between the first or second pane of glazing material and the layer of SiOx, more preferably wherein the layer of SiOx is an outermost layer of the infrared reflecting film. The layer of SiOx may be deposited using a Si target containing up to 30 wt % $Al_2O_3$ so depositing an SiOx:Al layer, wherein said layer may containing up to 15 wt % $Al_2O_3$.

Preferably the at least one adhesive ply comprises polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the at least one adhesive ply has a thickness between 0.3 mm and 2.3 mm, preferably between 0.3 mm and 1.6 mm, more preferably between 0.3 mm and 0.9 mm.

Preferably the interlayer structure comprises at least two adhesive plies.

Preferably the interlayer structure comprises at least two adhesive plies spaced apart from one another.

Preferably the interlayer structure has less than twenty adhesive plies, more preferably less than ten adhesive plies, even more preferably less than five adhesive plies.

Preferably the interlayer structure has only one adhesive ply or only two adhesive plies or only three adhesive plies.

From a third aspect the present invention provides a laminated glazing comprising at least two (a first and a second) panes of glazing material joined by an interlayer structure comprising at least one adhesive ply, each of the first and second panes of glazing material having respectively a first major surface and an opposing major surface, wherein the laminated glazing is configured such that the second major surface of the first pane of glazing material faces the first major surface of the second pane of glazing material, there being an infrared reflecting film between the first and second panes of glazing material, further wherein the first major surface of the first pane of glazing material is an exposed surface of the laminated glazing such that light directed towards the first major surface of the first pane of glazing material at an angle of incidence is reflected off the laminated glazing to produce a first reflection, a second reflection and a third reflection, the first reflection being from light reflected from the first major surface of the first pane of glazing material, the second reflection being from light reflected from the second major surface of the second pane of glazing material and the third reflection being from light reflected from the infrared reflecting film, wherein the laminated glazing comprises between the first major surface of the first pane of glazing material and the second major surface of the second pane of glazing material light intensity reducing means for reducing the intensity of the third reflection.

Suitably the laminated glazing may be used as a combiner in a head up display.

Preferably the light intensity reducing means is between the first major surface of the first pane of glazing material and the infrared reflecting film.

Preferably the light intensity reducing means comprises light absorbing means.

Preferably the laminated glazing comprises between the first major surface of the first pane of glazing material and the second major surface of the second pane of glazing material light intensity reducing means for reducing the intensity of the third reflection such that upon directing a beam of electromagnetic radiation having an intensity $I_o$ at 770 nm toward the first major surface of the first pane of glazing material at an angle of incidence of 60° to a normal on the on the first major surface of the first pane of glazing material, the intensity of the third reflection at a wavelength of 770 nm is less than or equal to $0.185 \times I_o$.

The intensity of the third reflection at a particular wavelength is the mean average of the third reflection at that wavelength under both p and s polarised electromagnetic radiation.

The third aspect of the present invention has other preferable features similar to the first aspect of the present invention previously described.

Preferably the laminated glazing comprises between the first major surface of the first pane of glazing material and the second major surface of the second pane of glazing material light intensity reducing means for reducing the intensity of the third reflection such that upon directing a beam of electromagnetic radiation having an intensity $I_o$ at 60 nm toward the first major surface of the first pane of glazing material at an angle of incidence of 60° to a normal on the on the first major surface of the first pane of glazing material, the intensity of the third reflection at a wavelength of 660 nm is less than or equal to $0.13 \times I_o$.

Preferably the laminated glazing comprises between the first major surface of the first pane of glazing material and the second major surface of the second pane of glazing material light intensity reducing means for reducing the intensity of the third reflection such that upon directing a beam of electromagnetic radiation having an intensity $I_o$ at 750 nm toward the first major surface of the first pane of glazing material at an angle of incidence of 60° to a normal on the on the first major surface of the first pane of glazing material, the intensity of the third reflection at a wavelength of 750 nm is less than or equal to $0.17 \times I_o$.

In some embodiments the light intensity reducing means is provided by the first pane of glazing material.

Preferably the first pane of glazing material comprises absorbing means for reducing the intensity of the third reflection.

Preferably the first pane of glazing material comprises glass, more preferably soda-lime-silica glass. A typical soda-lime-silica glass composition is (by weight), $SiO_2$ 69-74%;

$Al_2O_3$ 0-3%; $Na_2O$ 10-16%; $K_2O$ 0-5%; MgO 0-6%; CaO 5-14%; $SO_3$ 0-2%; $Fe_2O_3$ 0.005-2%. The glass composition may also contain other additives, for example, refining aids, which would normally be present in an amount of up to 2%.

Preferably the first pane of glazing material is a sheet of glass, in particular soda-lime-silica glass, comprising a colourant portion comprising iron oxide ($Fe_2O_3$). Preferably the level of iron oxide in the glass composition of the first pane of glazing material is between 0.15% and 2% by weight $Fe_2O_3$, more preferably between 0.2% and 1.5% by weight $Fe_2O_3$.

In some embodiments the first pane of glazing material comprises a coating on the second major surface thereof, and the coating comprises at least one light absorbing layer for reducing the intensity of the third reflection. The coating on the second major surface of the first pane of glazing material may be part of the infrared reflecting film, or separate thereto.

Preferably the at least one light absorbing layer of the coating on the second major surface of the first pane of glazing material has a thickness between 0.1 nm and 5 nm, more preferably 0.1 nm and 3 nm, even more preferably 0.2 nm and 2.5 nm.

Preferably the at least one light absorbing layer of the coating on the second major surface of the first pane of glazing material comprises nichrome or an oxide or nitride of nichrome These oxides or nitrides of nichrome may be stoichiometric, sub-stoichiometric or super-stoichiometric.

In some embodiments the second pane of glazing material comprises a coating on the first major surface thereof, and the coating comprises at least one optical absorbing layer for reducing the intensity of the third reflection. The coating on the first major surface of the second pane of glazing material may be part of the infrared reflecting film, or separate thereto.

Preferably the at least one light absorbing layer of the coating on the first major surface of the second pane of glazing material has a thickness between 0.1 nm and 5 nm, more preferably between 0.1 nm and 3 nm, even more preferably between 0.2 nm and 2.5 nm.

Preferably the at least one light absorbing layer of the coating on the first major surface of the second pane of glazing material comprises nichrome or an oxide or nitride of nichrome These oxides or nitrides of nichrome may be stoichiometric, sub-stoichiometric or super-stoichiometric.

In some embodiments the infrared reflecting film comprises at least one layer comprising silver. Preferably the thickness of the at least one layer comprising silver is between 1 and 20 nm, more preferably between 5 and 15 nm.

Preferably the infrared reflecting film comprises at least one layer of silver, preferably wherein the thickness of the at least one layer of silver is between 1 and 20 nm, more preferably between 5 and 15 nm.

Preferably the infrared reflecting film comprises at least two layers, each of the at least two layers comprising silver.

Preferably the infrared reflecting film comprises at least three layers, each of the at least three layers comprising silver.

In some embodiments the light intensity reducing means for reducing the intensity of the third reflection comprises a light absorbing coating layer.

Preferably the infrared reflecting film comprises the light absorbing coating layer.

Preferably the light absorbing coating layer is on the second major surface of the first sheet of glazing material.

Preferably the light absorbing coating layer is on the first major surface of the second pane of glazing material.

Preferably the light absorbing coating layer comprises nichrome or an oxide or nitride of nichrome. These oxides or nitrides of nichrome may be stoichiometric, sub-stoichiometric or super-stoichiometric.

Preferably the light absorbing coating layer has a thickness between 0.1 nm and 5 nm, more preferably between 0.1 nm and 3 nm, even more preferably between 0.2 nm and 2.5 nm.

In some embodiments the infrared reflecting film is on the second major surface of the first pane of glazing material.

In some embodiments the infrared reflecting film is on the first major surface of the second pane of glazing material.

In some embodiments the infrared reflecting film is on a carrier ply, the carrier ply not being the first or second panes of glazing material.

Embodiments of the third aspect of the present invention have other preferable features.

Preferably the first and/or second pane of glazing material is body tinted.

Preferably the thickness of the infrared reflecting film is between 100 nm an 300 nm, more preferably between 150 nm and 250 nm, even more preferably between 160 nm and 200 nm.

Preferably the infrared reflecting film is a multilayer coating comprising at least one metal layer, in particular at least one silver layer.

Preferably the infrared reflecting film comprises at least one layer of ZnSnOx, ZnO or ZnO:Al, where ZnO:Al is ZnO doped with $Al_2O_3$, typically at a level of about 3 wt % $Al_2O_3$.

Preferably the infrared reflecting film comprises at least one layer of ZnSnOx spaced apart from the first or second pane of glazing material by at least one layer of silver. The at least one ZnSnOx layer may be deposited by reactive sputtering from an approximately 50/50 wt % Zn:Sn target.

Preferably the infrared reflecting film comprises a first layer in direct contact with the first or second pane of glazing material, preferably wherein the first layer is ZnSnOx, ZnO or ZnO:Al, where ZnO:Al is ZnO doped with $Al_2O_3$, typically at a level of about 3 wt % $Al_2O_3$.

Preferably the infrared reflecting film comprises at least a first layer comprising silver in between a first layer of ZnSnOx, ZnO or ZnO:Al and a second layer of ZnSnOx, ZnO or ZnO:Al, preferably wherein the first layer of ZnSnOx, ZnO or ZnO:Al is in direct contact with the first or second pane of glazing material, where ZnO:Al is ZnO doped with $Al_2O_3$, typically at a level of about 3 wt % $Al_2O_3$.

Preferably the infrared reflecting film comprises a first layer comprising silver and a second layer comprising silver, the first layer comprising silver being between a first layer of ZnSnOx, ZnO or ZnO:Al and a second layer of ZnSnOx, ZnO or ZnO:Al, the first layer of ZnSnOx, ZnO or ZnO:Al preferably being in direct contact with the first or second pane of glazing material; and the second layer comprising silver being between the second layer of ZnSnOx, ZnO or ZnO:Al and a third layer of ZnSnOx, ZnO or ZnO:Al, where ZnO:Al is ZnO doped with $Al_2O_3$, typically at a level of about 3 wt % $Al_2O_3$.

Preferably the infrared reflecting film comprises a first layer in direct contact with the first or second pane of glazing material, the first layer being ZnSnOx and having a thickness between 25 nm and 32 nm, Preferably the infrared reflecting film comprises a first layer of ZnSnOx having a thickness between 25 nm and 32 nm and being in direct contact with the first or second pane of glazing material, wherein the infrared reflecting film further comprises a layer of ZnOx having a thickness less than 7 nm on the first layer of ZnSnOx.

Preferably the infrared reflecting film comprises a first layer of ZnSnOx having a thickness between 25 nm and 32 nm and being in direct contact with the first or second pane of glazing material, wherein the infrared reflecting film further comprises a second layer of ZnSnOx having a thickness between 75 nm and 85 nm and at least one layer of silver between the first and second layers of ZnSnOx, preferably wherein the at least one layer of silver has a thickness between 8 nm and 13 nm.

Preferably the infrared reflecting film comprises a first layer of ZnSnOx having a thickness between 25 nm and 32 nm and being in direct contact with the first or second pane of glazing material, a second layer of ZnSnOx having a thickness between 75 nm and 85 nm, and a layer of silver preferably having a thickness between 7 nm and 13 nm between the first and second layers of ZnSnOx, wherein the infrared reflecting film further comprises a third layer of ZnSnOx preferably having a thickness between 30 nm and 45 nm and another layer of silver between the second and third layers of ZnSnOx, the another layer of silver preferably having a thickness between 7 nm and 15 nm.

Preferably the infrared reflecting film comprises a first layer in direct contact with the first or second pane of glazing material, the first layer being ZnO or ZnO:Al and preferably having a thickness between 30 nm and 40 nm, where ZnO:Al is ZnO doped with $Al_2O_3$, typically at a level of about 3 wt % $Al_2O_3$.

Preferably the infrared reflecting film comprises a first layer in direct contact with the first or second pane of glazing material, the first layer being ZnO or ZnO:Al and preferably having a thickness between 30 nm and 40 nm, wherein the infrared reflecting film further comprises a second layer of ZnO or ZnO:Al with at least one layer of silver therebetween, the second layer of ZnO or ZnO:Al preferably having a thickness between 75 nm and 85 nm and the at least one layer of silver preferably having a thickness between 7 nm and 13 nm, where ZnO:Al is ZnO doped with $Al_2O_3$, typically at a level of about 3 wt % $Al_2O_3$.

Preferably the infrared reflecting film comprises a layer of SiOx and at least one layer comprising silver, the at least one layer comprising silver being between the first or second pane of glazing material and the layer of SiOx, more preferably wherein the layer of SiOx is an outermost layer of the infrared reflecting film. The layer of SiOx may be deposited using a Si target containing up to 30 wt % $Al_2O_3$ so depositing an SiOx:Al layer, wherein said layer may containing up to 15 wt % $Al_2O_3$.

Preferably the at least one adhesive ply comprises polyvinyl butyral (PVB), acoustic modified PVB, a copolymer of ethylene such as ethylene vinyl acetate (EVA), polyurethane (PU), polycarbonate, poly vinyl chloride (PVC) or a copolymer of ethylene and methacrylic acid.

Preferably the at least one adhesive ply has a thickness between 0.3 mm and 2.3 mm, preferably between 0.3 mm and 1.6 mm, more preferably between 0.3 mm and 0.9 mm.

Preferably the interlayer structure comprises at least two adhesive plies.

Preferably the interlayer structure comprises at least two adhesive plies spaced apart from one another.

Preferably the interlayer structure has less than twenty adhesive plies, more preferably less than ten adhesive plies, even more preferably less than five adhesive plies.

Preferably the interlayer structure has only one adhesive ply or only two adhesive plies or only three adhesive plies.

Preferably at normal incidence the laminated glazing has a visible light transmission (CIE Illuminant A 10 degree observer) of greater than 70% or 71% or 72% or 73% or 74% or 75%, more preferably between 70% and 80%.

Preferably at normal incidence the laminated glazing has a total transmitted solar (TTS % measured using ISO 13837:2008 Convention A (with outside surface wind velocity $v_1$ of approximately 4 m/s) of less than 60%, more preferably less than 55%, even more preferably less than 50%.

Preferably at normal incidence the percentage of light reflected from the second major surface of the second pane of glazing material CIE Illuminant D65 10 degree observer) is less than 12%, preferably less than 11%, more preferably less than 10%.

Preferably at normal incidence the light reflected from the second major surface of the second pane of glazing material (CIE Illuminant D65 10 degree observer) has an a* less than or equal to zero, preferably between −10 and zero.

Preferably at normal incidence the light reflected from the second major surface of the second pane of glazing material (CIE Illuminant D65 10 degree observer) has a b* less than or equal to zero, preferably between −15 and zero, more preferably between −10 and zero.

Preferably the first pane of glazing material and the second pane of glazing material are not parallel to one another.

Preferably the second major surface of the first glazing pane is a concave surface and the second major surface of the second glazing pane is an opposing convex surface.

Preferably the thickness of the first and/or second pane of glazing material is between 1 mm and 4 mm, preferably between 1.5 mm and 2.5 mm.

Preferably the thickness of the laminated glazing is between 3 mm and 10 mm.

Preferably the laminated glazing is curved in at least one direction. Preferably the radius of curvature in the at least one direction is between 500 mm and 20000 mm, more preferably between 1000 mm and 8000 mm.

Preferably the first pane of glazing material is a chemically strengthened glass pane and the second pane of glazing material is a sheet of soda-lime-silica glass.

Preferably prior to being incorporated into the laminated glazing, the infrared reflecting film is on the first or second sheet of glazing material and the sheet resistance ($\Omega/\square$) of the infrared reflecting film is between $2\Omega/\square$ and $4\Omega/\square$, more preferably between $2.5\Omega/\square$ and $3.5\ \Omega/\square$.

Preferably in the laminated glazing, the infrared reflecting film is on the second major surface of the first sheet of glazing material and the sheet resistance ($\Omega/\square$) of the infrared reflecting film is between $2\Omega/\square$ and $4\Omega/\square$, more preferably between $2.5\Omega/\square$ and $3.5\ \Omega/\square$.

Preferably in the laminated glazing, the infrared reflecting film is on the first major surface of the second sheet of glazing material and the sheet resistance ($\Omega/\square$) of the infrared reflecting film is between $2\Omega/\square$ and $4\Omega/\square$, more preferably between $2.5\Omega/\square$ and $3.5\ \Omega/\square$.

The invention will now be described with reference to the following figures (not to scale) in which, FIG. 1 shows a cross section through a laminated glazing such as a vehicle windscreen to indicate the light paths from a head up display illumination source;

Figure 6:
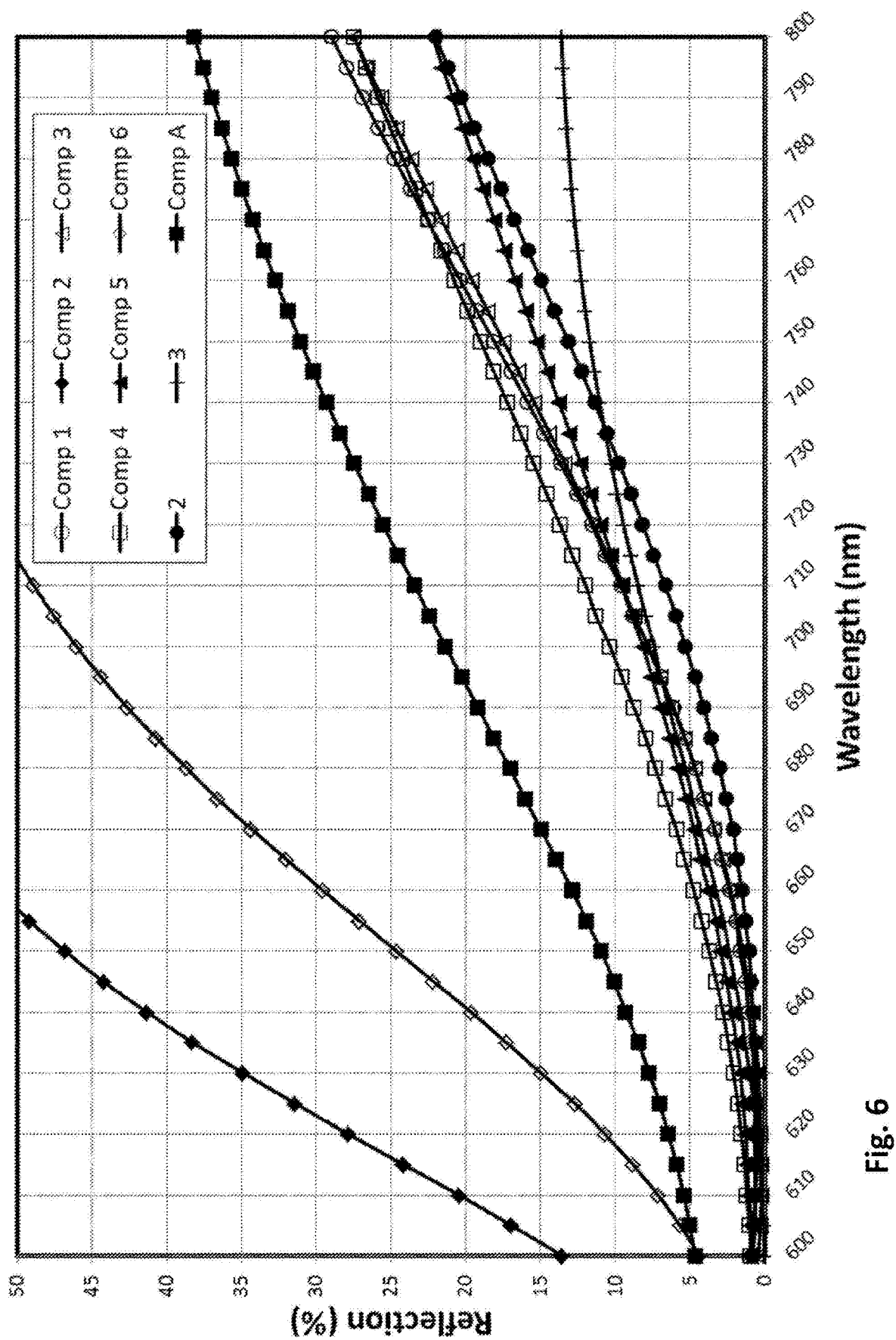
Figure 7:
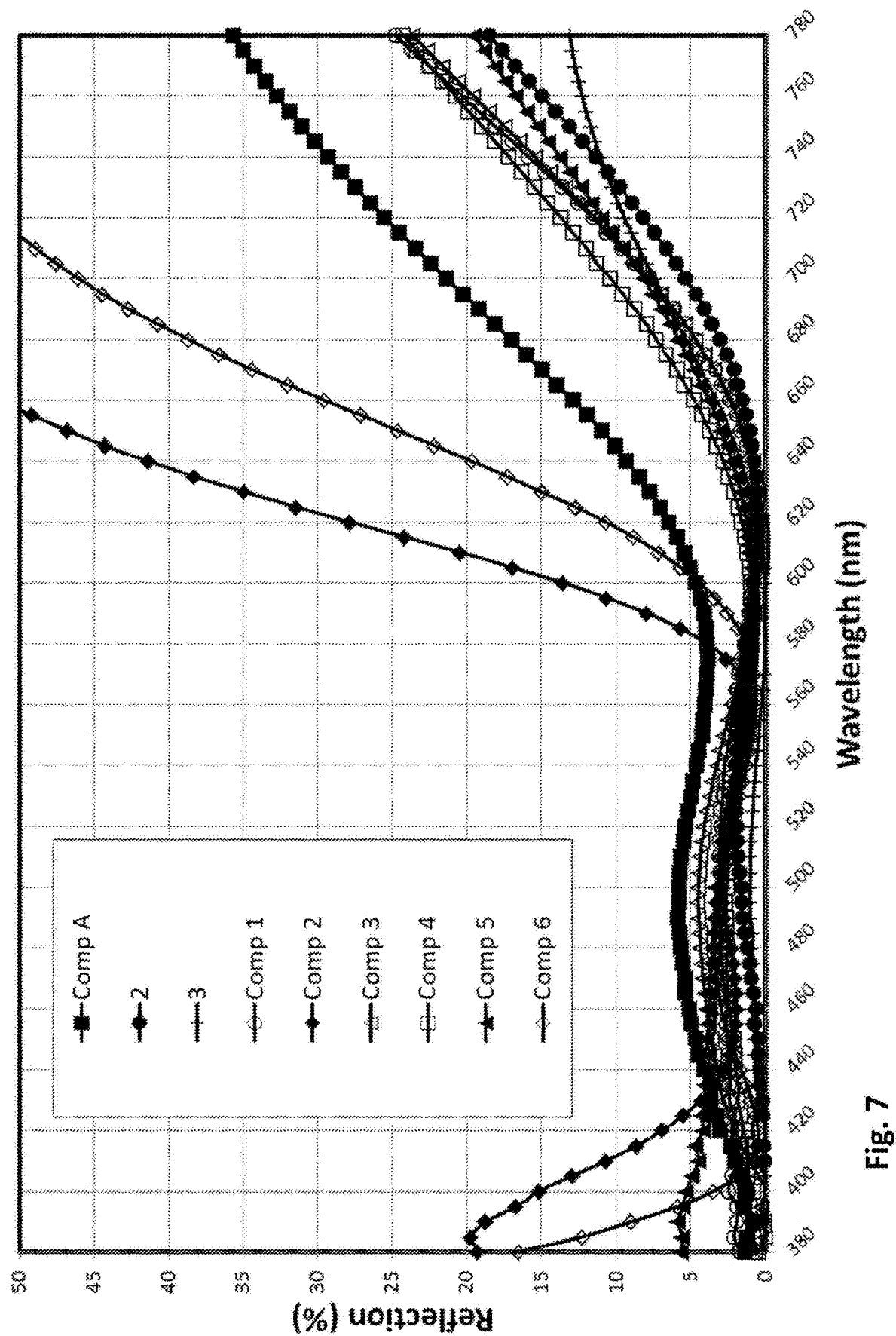

FIG. 6 shows the spectral distribution of the third reflection between 600 nm and 800 nm from different laminated glazings determined using an s-polarised incident beam at an angle of 60° to a normal on the glazing surface; and FIG. 7 shows the spectral distribution of the third reflection between 380 nm and 780 nm from different laminated glazings determined using an s-polarised incident beam at an angle of 60° to a normal on the glazing surface.

Figure 1:
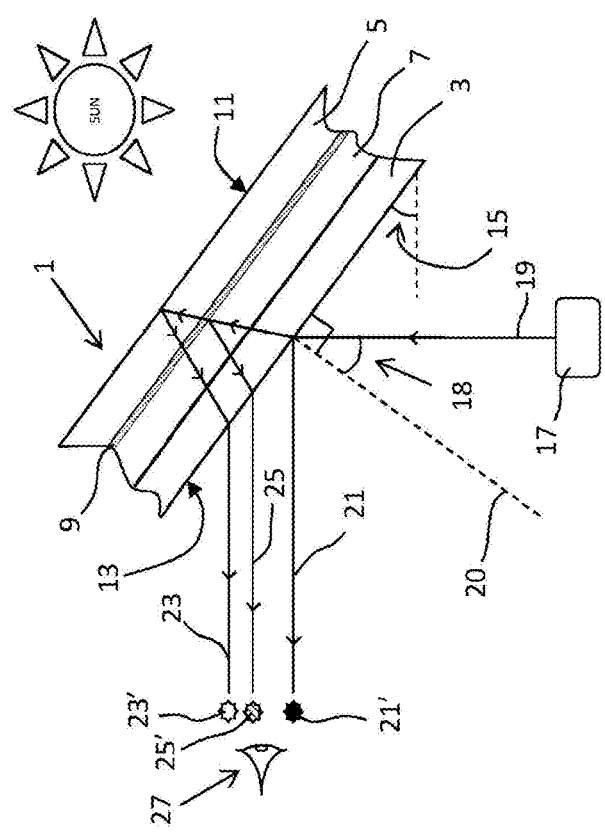

FIG. 1 shows a schematic cross section of a laminated glazing 1, for example a vehicle windscreen. The laminated glazing 1 comprises a first sheet of glass 3 and a second sheet of glass 5. Both glass sheets 3, 5 have a soda-lime-silica composition. Although in FIG. 1 the laminated glazing 1 is shown as being flat (or planar) in cross section, typically the laminated glazing 1 would have a convex outer surface (facing the sun) and an opposing concave inner surface. Glass bending processes are well known in the art for shaping a flat glass sheet, for example gravity sag bending or press bending between complementary bending members a heat softened glass sheet.

The first sheet of glass 3 is joined to the second sheet of glass 5 by an adhesive interlayer ply 7. In this example the adhesive interlayer material is PVB, but other adhesive interlayers materials are known in the art, for example ethylene vinyl acetate (EVA). The adhesive interlayer ply 7 is not tinted in the visible region, but may be. Instead of a single adhesive interlayer ply 7, there may be two or more adhesive interlayers plies, one or more of which may be tinted.

The first sheet of glass 3 is uncoated whereas the second sheet of glass 5 has an infrared reflecting film 9 on the major surface thereof facing the interlayer ply 7. In this example the interlayer ply 7 is in direct contact with the infrared reflecting film 9. The infrared reflecting film 9 may be deposited on the major surface of the second sheet of glass using atmospheric pressure chemical vapour deposition and/or magnetron sputtering. When the laminated glazing is curved as described above, the infrared reflecting film may be deposited before or after the glass bending process.

In this example the infrared reflecting film 9 is a multi-layer coating comprising two silver layers.

A suitable layer configuration for the infrared reflecting film 9 is given in table 1.

Methods are known in the art for depositing the infrared reflecting film, see for example WO2009/001143A1, WO2010/073042A1, WO2012/007737A1, WO2012/110823A1 and WO2012/143704A1.

For example the infrared reflecting film of table 1 may be deposited using AC and/or DC magnetron sputtering devices, medium-frequency, pulsed DC, or bipolar pulsed DC sputtering being applied where appropriate.

Dielectric layers of an oxide of Zn and Sn (ZnSnOx, weight ratio Zn:Sn≈50:50) may be reactively sputtered from zinc-tin targets in an Ar/$O_2$ sputter atmosphere. The weight ratio of Zn to Sn in a ZnSnOx layer may be between 40 and 60% by weight i.e. a ZnSnOx layer, weight ratio Zn:Sn≈40:60 and a ZnSnOx layer, weight ratio Zn:Sn≈60:40.

Layers of silver (Ag) may consist of essentially pure silver (Ag) and may be sputtered from silver targets in an Ar sputter atmosphere without any added oxygen and at a partial pressure of residual oxygen below 10−5 mbar.

Layers of Ti may be sputtered from titanium targets (99.9% purity) and act as a barrier layer for the silver layer beneath. As will be readily apparent, the layer of Ti so deposited may be oxidised upon depositing a subsequent layer thereon, such that the layer of Ti is oxidised to TiOx, where x may be about 2. $TiO_2$ layers may be directly deposited using slightly substoichiometric conductive TiOx targets (where x is about 1.98) in a pure Ar sputter atmosphere without added oxygen.

Layers of ZnO:Al may be sputtered from conductive ZnOx:Al targets in a pure Ar sputter atmosphere, with or without low levels of added oxygen. ZnO:Al layers may also be sputtered from Al-doped Zn targets (with an Al content about 2 wt. %) in an Ar/$O_2$ sputter atmosphere.

ZnOx layers may be sputtered from Zn targets in an Ar/$O_2$ sputter atmosphere.

Suboxidic NiCrOx layers may be sputtered from $Ni_{80}Cr_{20}$ targets in an Ar/$O_2$ sputter atmosphere.

Layers of SiOx may be deposited using a Si target containing up to 30 wt % $Al_2O_3$ so depositing an SiOx:Al layer, i.e. said SiOx layer may contain up to 15 wt % $Al_2O_3$.

The multilayer coating shown in table 1 was deposited on the major surface of the second glass sheet 5 using magnetron sputtering. As shown in table 1, there is a ZnSnOx layer adjacent the glass surface. Other example infrared reflecting films are provided in table 3, Samples 1-4. The infrared reflecting film in table 1 is also provided in table 3 for Sample 5.

In FIG. 1 the PVB interlayer ply 7 is not a wedged PVB interlayer, although the PVB interlayer may be a wedged PVB interlayer.

TABLE 1

| Layer | Layer thickness (nm) |
|---|---|
| | Glass |
| ZnSnOx | 28.3 |
| ZnOx | 5 |
| Ag | 8.4 |
| Ti | 1.1 |
| ZnSnOx | 83.1 |
| ZnOx | 5 |
| Ag | 11 |
| Ti | 1.1 |
| ZnSnOx | 40 |
| SiOx | 5.7 |

Using conventional nomenclature, the outer facing major surface 11 of the laminated glazing 1 (i.e. the major surface facing the sun) is known as "surface one" or simply "S1". The opposing major surface of the second glass sheet 5 is "surface two", or "S2" of the laminated glazing 1. The major surface 13 of the sheet of first sheet of glass 3 is referred to as "surface four", or "S4" of the laminated glazing 1. The opposing major surface of the first glass sheet 3 is referred to as "surface three", or "S3" of the laminated glazing 1.

As is conventional in the art, when the laminated glazing 1 is a vehicle windscreen, the first sheet of glass 3 is usually known as the inner pane or the inner ply of the windscreen and the second sheet of glass 5 is usually known as the outer pane or the outer ply of the windscreen.

As is evident from FIG. 1, both major surfaces 11, 13 are exposed major surfaces.

The laminated glazing 1 may be manufactured using conventional laminating conditions using high temperature and pressure, for example subjecting the unlaminated stack of individual components to a temperature of about 100° C. to 150° C. and pressure of about 5 to 15 atmospheres.

FIG. 1 illustrates how three images may be observed when the laminated glazing is viewed in a horizontal direction with the laminated glazing 1 inclined at an angle 15 to the horizontal. This illustrates the situation when the laminated glazing 1 is installed as a windscreen in a vehicle, and the driver of the vehicle looks through the windscreen (i.e. laminated glazing 1) towards the road ahead.

Positioned below the laminated glazing 1 is a light source 17 configured to shine an incident beam of light 19 onto the major surface 13. The light source 17 may be part of a HUD system and may be a white light source. In this example the incident beam of light 19 is perpendicular to the horizontal (and is therefore vertical.

The incident beam of light 19 is at an angle 18 to a normal 20 on the major surface 13. Since the incident beam of light is vertical, the angle 15 to the horizontal is the same as the angle 18 to a normal on the glass surface 13.

The incident beam of light 19 strikes the major surface 13 and a percentage of the incident light beam is reflected off the major surface 13 as reflected beam 21 to give a first reflection. The reflected beam 21 is also at an angle 18 to the normal 20 on the glass surface 13.

As FIG. 1 illustrates, some of the incident beam of light 19 from the light source 17 is transmitted through the major surface 13 and gets refracted upon passing the air/glass boundary. Some of the incident beam of light is able to pass through the first glass sheet 3, the adhesive interlayer ply 7, the infrared reflecting film 9 and the glass sheet 5 to be reflected off the glass/air boundary (i.e. major surface 11) to emerge through the major surface 13 as reflected beam 23 to give a second reflection.

Some of the incident beam of light 19 from the light source 17 that passes through the first sheet of glass 3 and the adhesive interlayer ply 7 is reflected off the infrared reflecting film 9 to emerge through the major surface 13 as reflected beam 25 to give a third reflection.

An observer 27 positioned to view the glazing as illustrated will see three images, a first image 21' (often referred to as a "primary image") due to light from the first reflected beam 21 (i.e. the first reflection), a second image 23' (often known as a "secondary image") due to light from the second reflected beam 23 (i.e. the second reflection) and a third image 25' (often referred to as a "tertiary image") due to light from the third reflected beam 25 (i.e. the third reflection).

It will be readily apparent that if there is no infrared reflecting film 9 between the first and second sheets of glass 3, 5, there will not be a third image 25'.

The use of a wedged interlayer ply such as wedged PVB may bring the first and second images 21',23' into coincidence but it is not possible to bring all three images 21',23' and 25' into coincidence using a wedged interlayer ply instead of interlayer ply 7.

The first image 21' is usually the brightest and the first reflected beam 21 has a wavelength distribution essentially the same as the wavelength distribution of the incident light beam 19.

The wavelength distribution of the second and third reflected beams 23, 25 depends on the nature of the glass sheets, 3, 5, the adhesive interlayer ply 7 and the infrared reflecting film 9.

The three images (or two if a wedged interlayer ply is used) are distracting for the driver of the vehicle.

Whilst it may be possible to choose a suitable light source 17 in an attempt to minimise the visibility of the third image 25', it is particularly desirable to provide a laminated glazing that may be usable with different light sources, in particular different white light sources, having unknown spectral distributions.

In order to quantify the amount of reflection due to the reflection off the infrared reflecting film 9 (i.e. the spectral distribution intensity variation with wavelength of the absolute reflection of the third reflected beam 25), a commercially available double beam spectrophotometer was used to determine the intensity of the third reflection as a function of wavelength. In the tests carried out as described below, a CARY 7000 UMS spectrophotometer was used.

Using such a spectrophotometer allows a wavelength range to be scanned with a known intensity of incident electromagnetic radiation at each wavelength. The CARY 7000 UMS spectrophotometer allows a complete sample characterisation to be made, and allows absolute reflection measurements to be made at variable angles and polarization.

Before the CARY 7000 UMS spectrophotometer was used to make the absolute reflection measurements, a baseline was run for both p and s polarization states separately. The reference light source was provided by the spectrophotometer.

Each sample reflection measurement was then carried by measuring the p and s polarization states separately in reflection by using a polariser within the spectrophotometer at the required wavelength. The absolute reflection at a given wavelength was the mean average of the p and s polarization reflection measurements at that wavelength. That is:

$$R_\lambda^A = (R_\lambda^s + R_\lambda^p)/2 \qquad (1)$$

where
$R_\lambda^A$=the absolute reflection at wavelength $\lambda$;
$R_\lambda^s$=the reflection measured at wavelength $\lambda$ using s-polarised electromagnetic radiation; and
$R_\lambda^p$=the reflection measured at wavelength $\lambda$ using p-polarised electromagnetic radiation.

In accordance with the above, and with reference to FIG. 1, the absolute reflection spectrum of the laminated glazing 1 was determined by positioning the laminated glazing (or a portion thereof) in the sample housing of the spectrophotometer so that the angle of incidence to a normal on the sample surface was 60°. The light reflected from the laminated glazing was then captured by the spectrophotometer to measure the p and s polarization states in reflection separately at discussed above. With reference to FIG. 1, essentially the light source 17 was that provided by the spectrophotometer and the observer 27 was the detector system provided by the spectrophotometer (shown as detector 29 in FIGS. 2 and 3).

Determining the absolute reflection spectrum from the laminated glazing 1 in this manner, and with reference to FIG. 1, the reflected light measured by the spectrophotometer will contain light from the first, second and third reflected beams 21, 23 and 25. This makes it very difficult to obtain the spectral distribution of each individual reflected beam 21, 23 and 25.

Accordingly the samples were treated before being measured to suppress the reflection from the major surface 11 of the second sheet of glass 5 i.e. the major surface of the laminated glazing opposite the major surface where the light was incident i.e. the surface intended to be "surface one" of the laminated glazing when installed in a vehicle was treated.

This reflection was suppressed by sand blasting the major surface 11 and/or painting the major surface 11 with black paint. The configuration of the CARY 7000 UMS spectrophotometer also meant that if there was still any reflection from the treated surface, the scattered light was not collected by the detector.

With the reflection from the major surface 11 of the second sheet of glass 5 in the laminated glazing 1 suppressed, the treated laminated glazing was again inserted into the sample housing of the spectrophotometer for measurement at an angle of incidence of 60° as before.

Figure 2:
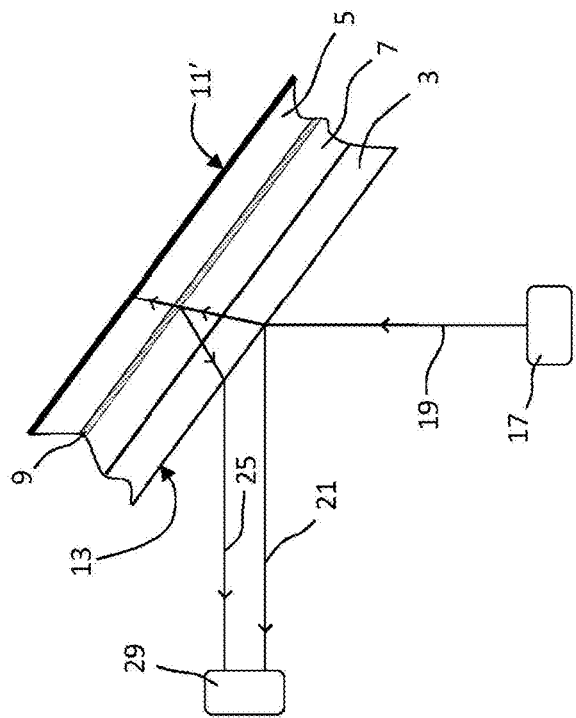
FIG. 2 shows a cross section through a laminated glazing where reflection from a major surface has been suppressed.

This is illustrated in FIG. 2 where the major surface 11 has been treated to suppress reflection therefrom, so is labelled as surface 11'. Given that the second reflected beam 23 has now been suppressed the spectrophotometer measures light only from the first and third reflected beams 21 and 25 i.e. the detector 29 of the spectrophotometer measures the combined reflection from the beams 21, 25. Again the s and p polarisation states were measured in reflection separately.

Figure 3:
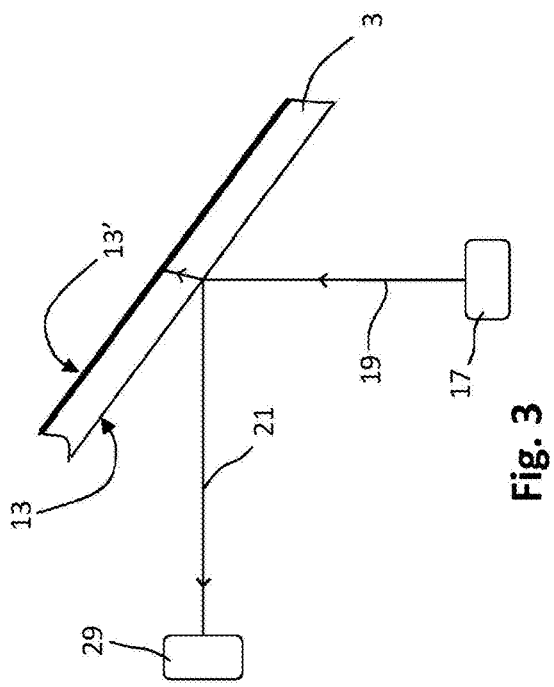
FIG. 3 shows a cross section through a single pane of glass where reflection from a major surface has been suppressed.

In order to determine the spectral distribution of the first reflected beam 21, a single glass sheet 3 was measured in the spectrophotometer as before at an angle of incidence of 60° with the reflection from the back surface suppressed in the same way as described above. This is illustrated in FIG. 3 where the sand blasted surface of the glass sheet 3 is labelled as 13'. In the configuration shown in FIG. 3, there is no reflection from the light source 17 off surface 13' towards the detector 29 from light that passes through the surface 13. Again the s and p polarisation states were measured in reflection separately.

With the configuration shown in FIG. 3, the spectral distribution of the first reflected beam 21 was obtained.

The variation of the absolute reflection as a function of wavelength of the third reflected beam 25 was then obtained as follows.

With reference to FIG. 2, the detector 29 measures the combined spectral distribution of the first and third reflected beams:

$$^1R_\lambda^s = SP1_\lambda^s + SP3_\lambda^s \quad (2)$$

$$^1R_\lambda^p = SP1_\lambda^p + SP3_\lambda^p \quad (3)$$

$$^1R_\lambda^A = (^1R_\lambda^s + ^1R_\lambda^p)/2 = (SP1_\lambda^s + SP1_\lambda^p + SP3_\lambda^p + SP3_\lambda^s)/2 \quad (4)$$

where
$\lambda$ is the wavelength in nanometres;
$^1R_\lambda^s$ is the reflection measurement at wavelength $\lambda$ made by the spectrophotometer using s-polarised electromagnetic radiation;
$^1R_\lambda^p$ is the reflection measurement at wavelength $\lambda$ made by the spectrophotometer using p-polarised electromagnetic radiation;
$SP1_\lambda^s$ is the reflection at wavelength $\lambda$ of the first reflected beam 21 under s-polarised electromagnetic radiation;
$SP3_\lambda^s$ is the reflection at wavelength $\lambda$ of the third reflected beam 25 under s-polarised electromagnetic radiation;
$SP1_\lambda^p$ is the reflection at wavelength $\lambda$ of the first reflected beam 21 under p-polarised electromagnetic radiation; and
$SP3_\lambda^p$ is the reflection at wavelength $\lambda$ of the third reflected beam 25 under p-polarised electromagnetic radiation.

The absolute reflection $^1R_\lambda^A$ at wavelength $\lambda$ is given by equation (4) and is the mean average of the reflection measurements made using both s and p polarised electromagnetic radiation.

With reference to FIG. 3, another set of measurements were made using the spectrophotometer and detector 29 measures the reflection that is due only to the reflected beam 21:

$$^2R_\lambda^s = SP1_\lambda^s \quad (5)$$

$$^2R_\lambda^p = SP1_\lambda^p \quad (6)$$

$$^2R_\lambda^A = (^2R_\lambda^s + ^2R_\lambda^p)/2 = (SP1_\lambda^s + SP1_\lambda^p)/2 \quad (7)$$

where
$\lambda$ is the wavelength in nanometres;
$^2R_\lambda^s$ is the reflection measurement at wavelength $\lambda$ made by the spectrophotometer using s-polarised electromagnetic radiation; and
$^2R_\lambda^p$ is the reflection measurement at wavelength $\lambda$ made by the spectrophotometer using p-polarised electromagnetic radiation.

The parameters $SP1_\lambda^s$ and $SP1_\lambda^p$ are as defined above. The absolute reflection $^2R_\lambda^A$ is given by equation (7) and is the mean average of the reflection measurements made using both s and p polarised electromagnetic radiation.

To determine the spectral distribution with wavelength of the absolute reflection of the third reflected beam 25 (which with reference to equation (1) is $(SP3_\lambda^p + SP3_\lambda^s)/2$), it is possible to subtract the absolute reflection spectrum containing only the reflection information from the first reflected beam 21 away from the absolute reflection spectrum containing the combined reflection information from both the first reflected beam 21 and the third reflected beam 25. This will leave only the absolute reflection variation with wavelength of the third reflected beam 25. With reference to the above equations, this is equivalent to equation (4)-equation (7):

$$(4)-(7) = {}^1R_\lambda^A - {}^2R_\lambda^A = (SP3_\lambda^s + SP3_\lambda^p)/2 = {}^3R_\lambda^A \quad (8)$$

where
$^3R_\lambda^A$ is the absolute reflection at wavelength $\lambda$ of the third reflected beam 25 due to reflection from the infrared reflecting film 9 in between the two sheets of glass 3, 5 of the laminated glazing 1.

It should be noted that the parameter $^3R_\lambda^A$ is dependent upon the angle of incidence of the incident beam of electromagnetic radiation, which in the above was at an angle of 60° to a normal on the sample surface. Accordingly it may be convenient to refer to a parameter $_{60}^3R_\lambda^A$ where the subscript "60" refers to the angle of incidence (in degrees) of the incident beam of electromagnetic radiation to a normal on the sample surface.

Figure 4:
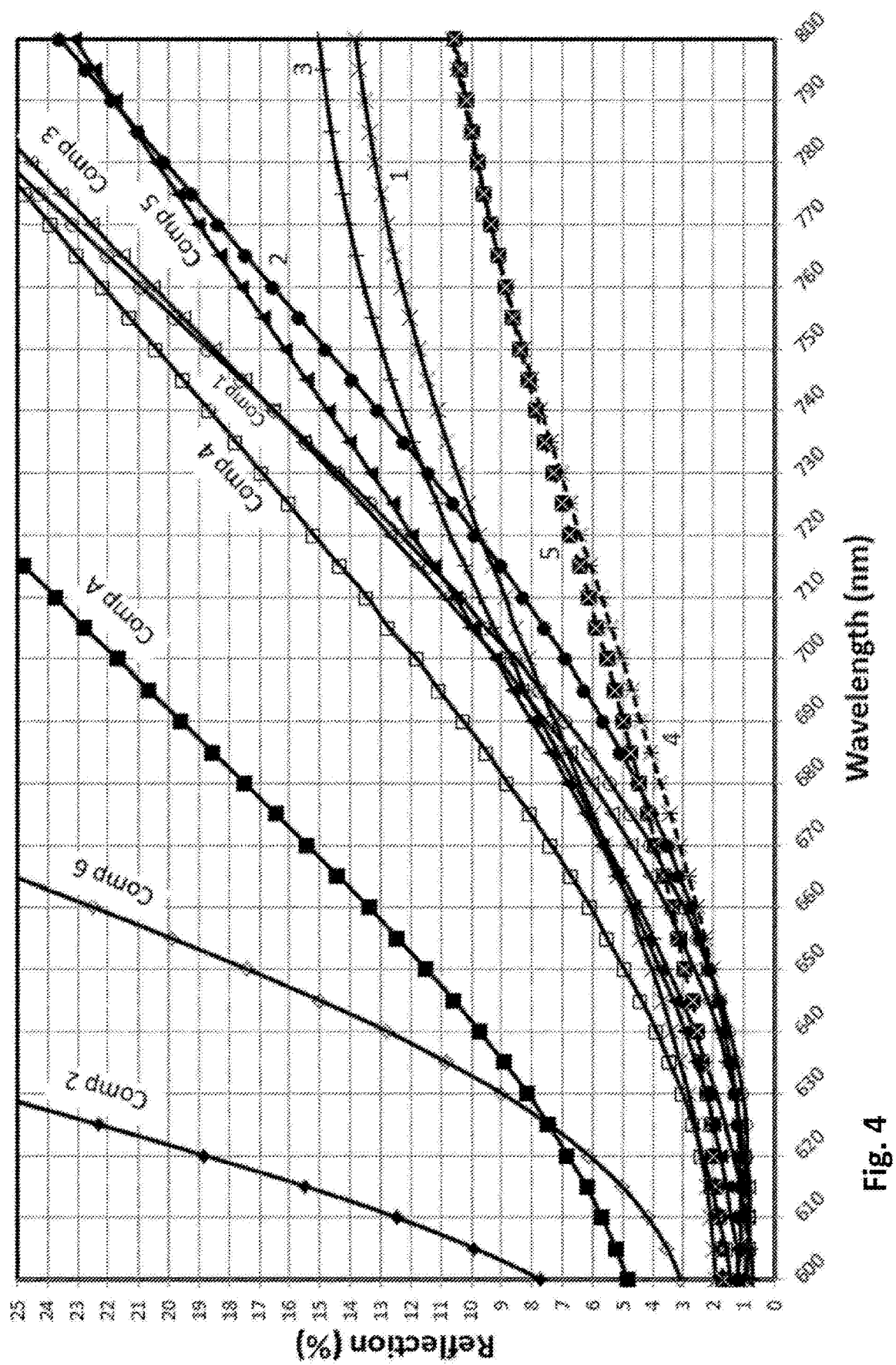
FIG. 4 shows the spectral distribution of the third reflection between 600 nm and 800 nm from different laminated glazings determined using an incident beam at an angle of 60° to a normal on the glazing surface.

With reference to FIG. 1, the infrared reflecting film 9 is configured to reflect infrared energy in the direction "surface 2"→"surface 1" i.e. to prevent infrared energy passing into the vehicle in which the laminated glazing 1 is installed. As such for an incident beam of electromagnetic radiation at an angle of incidence of 60° to a normal on the sample surface, $^3R_\lambda^A$ varies with wavelength over the visible part of the spectrum and over other selected wavelength regions, for example 600 nm to 800 nm as shown in FIG. 4.

A typical human eye is sensitive to wavelengths in the 380 nm to 780 nm range, so monitoring the amount of absolute reflection in the red end of the visible spectrum provides a useful guide to the intensity of the third image observable by a driver of a vehicle when the laminated glazing 1 is installed in a vehicle.

Using the approach described above a number of commercially available laminated glazings were measured with the Cary 7000 UMS spectrophotometer using an incident beam of electromagnetic radiation at an angle of incidence of 60° to a normal on the sample surface as described above and compared with different laminated glazings made in accordance with the present invention to determine the spectral distribution of the absolute reflection of the third reflected beam 25. The results are shown in FIG. 4 where the commercially available laminated glazings are denoted by "Comp 1-6".

The laminated glazing "Comp A" was made to illustrate the difficulty in achieving good solar control properties (high visible light transmission and low TTS %) and is an example of a type of infrared reflecting film that is commercially available.

With reference to FIG. 1, the glass sheet 3 would be denoted as the inner pane and the glass sheet 5 would be denoted as the outer pane.

Samples 1-5 were made in accordance with the present invention.

TABLE 2

| Sample | Comp A | 1 | 2 | 3 | 4 | 5 |
|---|---|---|---|---|---|---|
| Inner pane glass type | Clear float glass | Light Green Float Glass | Clear float glass | Light Green Float Glass | Light Green Float Glass | Light Green Float Glass |
| Inner pane thickness | 2.12 mm | 2.09 mm | 2.12 mm | 2.1 mm | 2.09 mm | 2.09 mm |
| Outer pane glass type | Clear float glass | Clear float glass | Clear float glass | Clear float glass | Clear float glass | Clear float glass |
| Outer pane thickness | 3.84 mm | 3.86 mm | 3.88 mm | 3.85 mm | 3.83 mm | 3.83 mm |
| Interlayer ply type | PVB | PVB | PVB | PVB | PVB | PVB |
| Interlayer ply thickness | 0.76 mm | 0.76 mm | 0.76 mm | 0.76 mm | 0.76 mm | 0.76 mm |
| Position of infrared reflecting film | Surface two | Surface two | Surface two | Surface two | Surface two | Surface two |

In all the samples in table 2, the infrared reflecting film was on the first major surface of the outer pane of glass and is therefore positioned in the laminated glazing as shown in FIG. 1 i.e. between major surface 11 and the adhesive interlayer ply 7 on the first major surface of the second glass sheet 5. As previously discussed, using conventional nomenclature this is surface two of the laminated glazing 1.

The individual layer type and thickness in nanometres (nm) and stack configuration of the infrared reflecting film 9 for each of the samples in table 2 was as shown in table 3. For the avoidance of doubt, with reference to FIG. 1, samples 1-5 each have the ZnSnOx layer highlighted in bold (also referred to as layer i) in direct contact with the glass sheet 5. Note that in Sample 2, the nichrome containing layer is a sub-stoichiometric oxide NiCrOx, although this layer may be a metal layer of NiCr or an oxide or nitride of nichrome with varying stoichiometry. As discussed above, a layer of Ti may be fully or partially oxidised (to TiOx) upon depositing a subsequent oxide layer thereon, such as a layer of ZnSnOx. Also as discussed above SiOx layers may contain $Al_2O_3$ up to 15% by weight (i.e. an SiOx:Al layer) depending upon the exact type of target used during sputtering.

In the above table 2 by "Clear float glass", it is meant a glass having a composition as defined in BS EN 572 1 and BS EN 572-2 (2012). The total iron oxide content of the clear float glass was about 0.082% by weight $Fe_2O_3$ with a ferrous content expressed as $Fe_2O_3$ of 27.3%.

In the above table 2, by "Light Green Float Glass" it is meant a soda-lime-silica glass composition (i.e. float glass) having an iron oxide of 0.56% by weight $Fe_2O_3$ at a ferrous content expressed as $Fe_2O_3$ of 24.5%. As is known in the art, a tinted float glass composition is often made by adding the desired level of colourants "on top" of a clear float glass batch composition, or at the expense of silica in the glass composition. A clear float batch composition is used to make a clear float glass having a composition as defined in BS EN 572 1 and BS EN 572-2 (2012).

TABLE 3

| Sample | Layer Reference | Comp A | 1 | 2 | 3 | 4 | 5 |
|---|---|---|---|---|---|---|---|
| | | | | GLASS | | | |
| ZnSnOx (nm) | i | — | 26.2 | 26.2 | 26.8 | 29.1 | 28.3 |
| ZnOx (nm) | ii | 33.3 | 5 | 5 | 5 | 5 | 5 |

TABLE 3-continued

| Sample | Layer Reference | Comp A | 1 | 2 | 3 | 4 | 5 |
|---|---|---|---|---|---|---|---|
| Ag (nm) | iii | 8.9 | 8.9 | 8.9 | 10 | 10.9 | 8.4 |
| Ti (nm) | iv | 1.1 | 1.1 | 1.1 | 1.1 | 1.1 | 1.1 |
| ZnSnOx (nm) | v | — | 82.4 | 79.7 | 79.8 | 80.5 | 83.1 |
| ZnOx (nm) | vi | 76.4 | 5 | 5 | 5 | 5 | 5 |
| Ag (nm) | vii | 11.6 | 11.6 | 11.6 | 11.7 | 8.6 | 11 |
| Ti (nm) | viii | 1.1 | 1.1 | — | 1.1 | 1.1 | 1.1 |
| NiCrOx (nm) | ix | — | — | 1.95 | — | — | — |
| ZnSnOx (nm) | x | — | 39 | 32.4 | 36.8 | 32 | 40 |
| ZnOx (nm) | xi | 23 | — | — | — | — | — |
| SiOx (nm) | xii | 5.7 | 5.7 | 5.7 | 5.7 | 5.7 | 5.7 |

In table 3 each layer was deposited using magnetron sputtering as previously discussed with reference to the coating shown in table 1. Other vacuum deposition processes (i.e. which are usually performed at a pressure of lower than about 0.1 mbar) may be used to prepare the infrared reflecting film, for example sputtering, reactive sputtering, evaporation and other forms of physical vapour deposition.

In other examples similar to those shown in table 3, layer i and/or layer ii may be a layer of ZnO or ZnO:Al, where ZnO:Al is ZnO doped with $Al_2O_3$, typically at a level of about 3 wt % $Al_2O_3$.

In other examples similar to those shown in table 3, layer i and ii may be replaced by a single layer i*, the single layer i* being in direct contact with the glass sheet 5 on one side and the layer iii on the opposite side. The single layer i* may be ZnSnOx, ZnOx, ZnO or ZnO:Al, where ZnO:Al is ZnO doped with $Al_2O_3$, typically at a level of about 3 wt % $Al_2O_3$. Put another way, the layer i and layer ii may be the same material and may be ZnSnOx, ZnOx, ZnO or ZnO:Al, where ZnO:Al is ZnO doped with $Al_2O_3$, typically at a level of about 3 wt % $Al_2O_3$. As is evident from the above examples of a coated glass sheet, the infrared reflecting film may have a layer of ZnSnOx, ZnO or ZnO:Al in direct contact with the glass surface.

Also as is evident from the above examples of a coated glass sheet, the infrared reflecting film may have a first layer comprising silver (i.e. a first layer of silver) in between a first layer of ZnSnOx, ZnO or ZnO:Al and a second layer of ZnSnOx, ZnO or ZnO:Al, the first layer of ZnSnOx, ZnO or ZnO:Al being in direct contact with the glass surface.

Also as is evident from the above examples of a coated glass sheet, the infrared reflecting film may have a first layer comprising silver (i.e. a first layer of silver) and a second layer comprising silver (i.e. a second layer of silver), the first layer comprising silver being between a first layer of ZnSnOx, ZnO or ZnO:Al and a second layer of ZnSnOx, ZnO or ZnO:Al, the first layer of ZnSnOx, ZnO or ZnO:Al being in direct contact with the glass surface; and the second layer comprising silver being between the second layer of ZnSnOx, ZnO or ZnO:Al and a third layer of ZnSnOx, ZnO or ZnO:Al.

Also as is evident from the above examples of a coated glass sheet, the infrared reflecting film may have a layer of SiOx, where at least one layer comprising silver is between the glass and the layer of SiOx. It is preferred for the layer of SiOx to be an outermost layer of the infrared reflecting film, for example there may be no other coating layer on the SiOx layer.

Also as discussed previously, a layer of SiOx may be deposited using a Si target containing up to 30 wt % $Al_2O_3$ such that an SiOx:Al layer is deposited that may contain up to 15 wt % $Al_2O_3$.

In addition to making measurements of the spectral distribution of the third reflected beam as described above, conventional normal incidence transmission and reflection measurements were also made for each laminated glazing and the results are shown in table 4. These properties for three other commercially available laminated glazings are provided and labelled as "Comp 7-9".

The column headed "Tvis (%)" in table 4 shows values of visible light transmission (CIE Illuminant A 10 degree observer).

The column headed "Rext vis (%)" in table 4 shows values of the reflection according to ISO 9050:2003 from "surface 1" of the glazing i.e. with reference to FIG. 1, the reflection of visible light from major surface 11.

The columns headed "Rext a*" and "Rext b*" in table 4 are values of the reflected colour from "surface 1" of the glazing (Illuminant D65 10 degree observer) i.e. with reference to FIG. 1, the reflected colour from major surface 11.

The column headed "TTS (%)" in table 4 shows the total transmitted solar values calculated in accordance with ISO 13837:2008 Convention A with outside wind velocity $v_1$ of approximately 4 m/s as specified in Appendix B, section B.2 of said standard.

The column headed "Sheet Resistance (Ω/□)" in table 4 is the sheet resistance of the coated glass sheet (coating side) prior to being incorporated into the laminated glazing. Instruments to make such sheet resistance measurements are commercially available, see for example NAGY, Messsysteme GmbH, Siedlerstr. 34, 71126 Gäufelden, Germany.

Sheet resistance may be an important parameter when the laminated glazing is to be used as a vehicle windscreen wherein the electrically conductive coating that reduces the amount of infrared energy entering the vehicle cabin in which the laminated glazing is installed may also be used to provide a heatable glazing function to reduce misting of the windscreen.

TABLE 4

| Sample | Thickness (mm) | Tvis (%) | Rext vis (%) | Rext a* | Rext b* | TTS (%) | Sheet resistance (Ω/□) |
|---|---|---|---|---|---|---|---|
| Comp A | 6.74 | 72.44 | 11.3 | −7.58 | −4.25 | 46.94 | 3.21 |
| 1 | 6.69 | 72.19 | 9.79 | −3.44 | −7.98 | 46.96 | 3.07 |
| 2 | 6.76 | 72.59 | 9.31 | −3.49 | −6.89 | 49.8 | 3.11 |
| 3 | 6.71 | 73.07 | 9.56 | −3.26 | −10.81 | 45.5 | 2.88 |
| 4 | 6.68 | 73.11 | 8.92 | −2.12 | −1.1 | 48.4 | 3.04 |
| 5 | 6.68 | 73.99 | 8.92 | −1.31 | −5.15 | 49.2 | 3.15 |
| Comp 1 | 5.4 | 77.2 | 11.1 | −7 | −2.7 | 52.8 | 2.7 |
| Comp 2 | 4.44 | 70.8 | 11.5 | 12 | −20.6 | 34.9 | 0.7 |
| Comp 3 | 4.99 | 79.2 | 11.4 | −7.2 | −1.4 | 53.4 | 2.5 |
| Comp 4 | 4.75 | 74.5 | 9.8 | −3.8 | −2.7 | 51.8 | 3.6 |
| Comp 5 | 4.5 | 73.5 | 8.8 | −3.22 | −5.11 | 51.2 | 4.1 |
| Comp 6 | 4.44 | 72.3 | 11.2 | −3.5 | −1.2 | 40.5 | 0.9 |
| Comp 7 | 4.46 | 78.4 | 9.6 | −3.9 | −3.6 | 55.5 | 5 |
| Comp 8 | 4.46 | 70.8 | 10.4 | −4.7 | −4.7 | 46.3 | 3.2 |
| Comp 9 | 4.46 | 77 | 9.9 | −5 | −5 | 50.4 | 3.2 |

Figure 5:
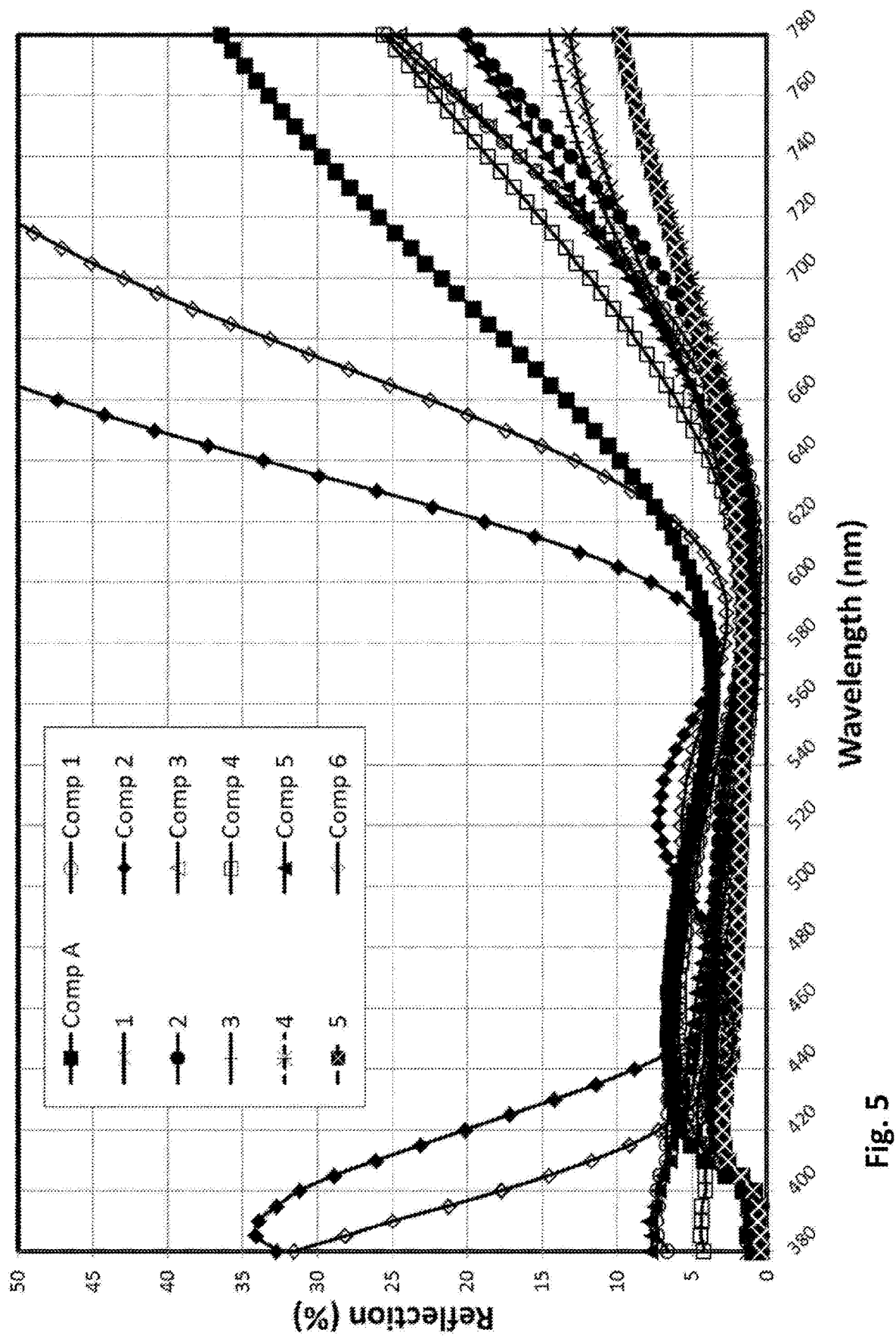
FIG. 5 shows the spectral distribution of the third reflection between 380 nm and 780 nm from different laminated glazings determined using an incident beam at an angle of 60° to a normal on the glazing surface.

The values of the absolute reflection $^3R_\lambda^A$ for the third reflected beam as a function of wavelength from the laminated glazings determined as described above (i.e. at an angle of incidence of 60° to a normal on the first major surface of the first pane of glazing material, using a double beam spectrophotometer and equations 1-8) are illustrated in FIG. 4 over the wavelength region 600-800 nm and in FIG. 5 over the wavelength region 380-780 nm. Specific absolute reflection values $^3R_\lambda^A$ for the third reflection (in %) at certain wavelengths taken from FIG. 4 and FIG. 5 are given in table 5.

TABLE 5

| | Absolute value of reflection of the third reflected beam (%) at wavelength: | | | |
|---|---|---|---|---|
| Sample | 660 nm ($^3R_{660}^A$) | 750 nm ($^3R_{750}^A$) | 770 nm ($^3R_{770}^A$) | 800 nm ($^3R_{800}^A$) |
| Comp A | 13.39 | 31.48 | 34.84 | 39.11 |
| 1 | 4.75 | 11.75 | 12.80 | 13.84 |
| 2 | 2.73 | 14.81 | 18.35 | 23.60 |
| 3 | 4.47 | 12.99 | 14.06 | 15.04 |
| 4 | 2.54 | 8.29 | 9.37 | 10.62 |
| 5 | 3.36 | 8.38 | 9.36 | 10.55 |
| Comp 1 | 2.98 | 18.72 | 23.15 | 29.60 |

TABLE 5-continued

| Sample | Absolute value of reflection of the third reflected beam (%) at wavelength: | | | |
|---|---|---|---|---|
| | 660 nm ($^3R_{660}^A$) | 750 nm ($^3R_{750}^A$) | 770 nm ($^3R_{770}^A$) | 800 nm ($^3R_{800}^A$) |
| Comp 2 | 47.33 | 73.27 | 74.87 | 76.30 |
| Comp 3 | 3.54 | 18.52 | 22.56 | 28.35 |
| Comp 4 | 6.07 | 20.42 | 23.9 | 28.88 |
| Comp 5 | 4.67 | 16.18 | 19.03 | 23.13 |
| Comp 6 | 22.49 | 58.66 | 62.14 | 65.46 |

With reference to FIG. 4 and the above tables, it can be seen that Sample 1, which has a light green float glass inner pane and a clear float glass outer pane, has a much reduced value of the absolute reflection $^3R_\lambda^A$ for the third reflected beam at 770 nm compared to sample Comp A (12.8% for Sample 1 compared to 34.84% for Comp A). Note that sample Comp A has both inner and outer panes of clear float glass.

With reference to the FIG. 4 and table 5, at 770 nm Sample 1 has an absolute reflection $^3R_\lambda^A$ of 12.80%, meaning that compared to the reference beam at 770 nm, the intensity of the third reflection determined according to the above (see also equations 1-8) at 770 nm is 0.1280×$I_o$, where $I_o$ is the intensity of the reference beam at 770 nm. That is, the absolute reflection $^3R_\lambda^A$ of the third reflected beam at 770 nm is 12.80%.

Sample 2, which has both the inner and outer panes of clear float glass, has an infrared reflecting film on surface 2 comprising a layer of NiCrOx. As seen from FIG. 4, the NiCrOx layer of Sample 2 reduces the intensity of the absolute reflection of the third reflected beam compared to the sample Comp A, but not to the same extent as for Sample 1. The intensity of the third reflected beam may be further reduced by using a thicker NiCrOx layer.

Sample 3 is similar to Sample 1 and has acceptable Tvis (%) and TTS (%) for use as a vehicle windscreen.

Sample 4 has a more neutral colour in reflection from surface 1 of the laminated glazing which may be more desirable in certain applications.

Sample 5 has a similar intensity of the absolute reflection of the third reflected beam third compared to Sample 4. That is, for Sample 5 the absolute reflection of the third reflected beam at 770 nm is 9.36% compared to 9.37% for Sample 4.

As discussed above Samples 1, 3, 4 and 5 have the inner pane (i.e. glass sheet 3) of the laminated glazing as a sheet of soda-lime-silica glass containing 0.56% by weight iron oxide ($Fe_2O_3$) and the outer pane (i.e. glass sheet 5) as a sheet of clear float glass containing about 0.082% by weight iron oxide ($Fe_2O_3$), although it is preferred for the content of iron oxide in the outer pane to be lower i.e. 0.001-0.07% by weight $Fe_2O_3$. The outer pane may have an iron oxide content in the region 0.001-0.15% by weight $Fe_2O_3$ or 0.001-0.12% by weight $Fe_2O_3$.

The percentage of ferrous iron (expressed as $Fe_2O_3$) in the glass of the inner pane is preferably between 20% and 30% i.e. the glass of the inner pane comprises between 0.2× 0.56=0.112 wt % ferrous iron expressed as $Fe_2O_3$ and 0.3×0.56=0.168 wt % ferrous iron expressed as $Fe_2O_3$.

With reference to FIG. 1, the iron oxide content in the inner pane (i.e. sheet of glass 3) provides the laminated glazing 1 with means to reduce the intensity of the third reflected beam 25. Furthermore, the colour of the third reflection i.e. third image 25' may become more neutral compared to the laminated glazing having an inner pane of clear float glass.

In Sample 2 both the inner and outer panes of glass were clear float glass having an iron oxide ($Fe_2O_3$) content of about 0.0.082% by weight. With reference to FIG. 1, Sample 2 has an infrared reflecting film 9 having a 1.95 nm thick sub stoichiometric nichrome oxide layer to help selectively absorb the third reflected beam 25, thereby reducing the intensity of the third image 25' viewable by an observer.

A laminated glazing according to the present invention finds particular application as a vehicle windscreen, where the vehicle windscreen may be used as a combiner in a head up display system. In such a head up display (HUD) system it may be desirable to use an optical system that has a light source having a particular polarisation state, for example the light source of the optical system of the HUD may be s-polarised or p-polarised.

As is known in the art, the amount of specular reflection from a glass surface is a function of the angle of incidence and the polarisation state of the incident beam. For example, at an air/glass interface, at the Brewster angle an incident beam of p-polarised light has zero reflection and is fully refracted through the glass. In contrast, for an incident beam of s-polarised light at the Brewster angle, the reflectivity is not zero and an amount of the incident beam is reflected.

The Brewster angle $\theta_p$ (often known as the polarizing angle in the art) is defined by:

$$\tan\theta_p = \frac{n_2}{n_1} \quad (9)$$

where $\theta_p$ is measured relative to a normal on the surface of the medium having the refractive index $n_2$ i.e. a normal on a glass surface.

In the case of an incident beam travelling from air to glass, $n_2$ is the refractive index of glass and $n_1$ is the refractive index of air.

For example, a soda-lime-silica glass has a refractive index ($=n_2$) of 1.52 at 540 nm and the refractive index of air ($=n_1$) at 540 nm is 1.00. Using equation (9) above $\theta_p$ is about 56.7° to a normal on the glass surface. As such, for an incident beam of unpolarised light at an angle of incidence of 60° to a normal on the glass surface, the amount of p-polarised light that is reflected is very low (because the angle of incidence is close to the Brewster angle) and the reflection from the glass surface may be considered to be essentially only s-polarised light.

With reference to equations (2) and (5) above, when an incident beam of s-polarised light is used, $$^1R_\lambda^s = SP1_\lambda^s + SP3_\lambda^s \quad (2)$$

$$^2R_\lambda^s = SP1_\lambda^s \quad (5)$$

Hence, using equations (2) and (5) it is possible to isolate $SP3_\lambda^s$ (the reflection at wavelength $\lambda$ of the third reflected beam 25 under s-polarised electromagnetic radiation), see equation (10) below:

$$(2)-(5) = {^1R_\lambda^s} - {^2R_\lambda^s} = SP3_\lambda^s \quad (10)$$

As before, $SP3_\lambda^s$ is the reflection at wavelength $\lambda$ of the third reflected beam 25 under s-polarised electromagnetic radiation.

FIG. 6 is a graph showing the variation with wavelength between 600 nm and 800 nm of the reflected intensity of the third reflected beam using an incident beam of s-polarised electromagnetic radiation at an angle of incidence of 60° to a normal on the glass surface i.e. FIG. 6 shows the parameter $SP3_\lambda^s$ as described above and calculated using equation (10).

As expected there are strong similarities between the data presented in FIGS. 4 and 6 because the angle of incidence is close to the Brewster angle.

The values of the $SP3_\lambda^s$ parameter at 660 nm, 750 nm, 770 nm and 800 nm are provided in table 6 for an incident beam of s-polarised electromagnetic radiation at an angle of incidence of 60° to a normal on the glass surface.

TABLE 6

Value of reflection of the third reflected beam (%) at wavelength: (using s-polarised beam at angle of incidence of 60° to a normal on the glass surface)

| Sample | 660 nm ($SP3_{660}^s$) | 750 nm ($SP3_{750}^s$) | 770 nm ($SP3_{770}^s$) | 800 nm ($SP3_{800}^s$) |
|---|---|---|---|---|
| Comp A | 12.91 | 31.05 | 34.25 | 38.16 |
| 2 | 1.53 | 13.16 | 16.74 | 22.03 |
| 3 | 3.27 | 11.72 | 12.74 | 13.6 |
| Comp 1 | 2.37 | 18.11 | 22.59 | 29.00 |
| Comp 2 | 51.26 | 67.42 | 68.32 | 69.08 |
| Comp 3 | 2.27 | 17.47 | 21.62 | 27.5 |
| Comp 4 | 4.75 | 19 | 22.52 | 27.5 |
| Comp 5 | 3.77 | 15.23 | 18.10 | 22.22 |
| Comp 6 | 29.59 | 56.38 | 58.47 | 60.35 |

FIG. 7 is a similar to FIG. 6 and is a graph showing the variation with wavelength between 380 nm and 780 nm of the reflected intensity of the third reflected beam using an incident beam of s-polarised electromagnetic radiation at an angle of incidence of 60° to a normal on the glass surface. Again as expected, there are similarities with the data presented in FIGS. 5 and 7 because the angle of incidence is close to the Brewster angle.

The present invention provides a laminated glazing for use as a windscreen. The windscreen may be used as a combiner in a head up display system. In comparison to known laminated windscreens having an infrared reflecting film between the inner and outer glass panes, embodiments of the present invention have lower absolute reflection at 770 nm which translates to a reduced intensity third image being seen by the driver of the vehicle.

The invention claimed is:

1. A laminated glazing for use as a combiner in a head up display, the laminated glazing comprising
   at least two panes of glazing material joined by an interlayer structure comprising at least one adhesive ply, the at least two panes of glazing material including a first pane of glazing material and a second pane of glazing material,
   each of the first and second panes of glazing material having respectively a first major surface and an opposing second major surface,
   the second pane of glazing material comprising a soda lime glass having an iron oxide ($Fe_2O_3$) content of between 0.001% and 0.12% by weight,
   the laminated glazing being configured such that the second major surface of the first pane of glazing material faces the first major surface of the second pane of glazing material,
   an infrared reflecting film between the first and second panes of glazing material, the infrared reflecting film being a multilayer coating comprising at least one metal layer,
   the first major surface of the first pane of glazing material being an exposed surface of the laminated glazing such that light directed towards the first major surface of the first pane of glazing material at an angle of incidence of 60° to a normal on the first major surface of the first pane of glazing material is reflected off the laminated glazing to produce a first reflection, a second reflection and a third reflection,
   the first reflection being from light reflected from the first major surface of the first pane of glazing material, the second reflection being from light reflected from the second major surface of the second pane of glazing material and the third reflection being from light reflected from the infrared reflecting film,
   light intensity reducing means between the first major surface of the first pane of glazing material and the infrared reflecting film for reducing the intensity of the third reflection,
   such that upon directing a beam of electromagnetic radiation having an intensity $I_o$ at 770 nm toward the first major surface of the first pane of glazing material at an angle of incidence of 60° to a normal on the first major surface of the first pane of glazing material,
   the intensity of the third reflection at a wavelength of 770 nm is less than or equal to $0.185 \times I_o$, and
   at normal incidence the laminated glazing has a visible light transmission (CIE Illuminant A 10 degree observer) of greater than 70%.

2. A laminated glazing according to claim 1, wherein the intensity of the third reflection at 770 nm is less than or equal to $I_{770}$ where $I_{770}=0.18 \times I_o$ or $0.17 \times I_o$ or $0.16 \times I_o$ or $0.15 \times I_o$ or $0.14 \times I_o$ or $0.13 \times I_o$ or $0.12 \times I_o$, and/or wherein the beam of electromagnetic radiation has an intensity $I_o$ at a wavelength of 660 nm and the intensity of the third reflection at 660 nm is less than or equal to $0.13 \times I_o$, and/or wherein the beam of electromagnetic radiation has an intensity $I_o$ at a wavelength of 750 nm and the intensity of the third reflection at 750 nm is less than or equal to $0.17 \times I_o$.

3. A laminated glazing according to claim 1, wherein the light intensity reducing means for reducing the intensity of the third reflection is provided by at least one of the first pane of glazing material, the interlayer structure or a further light absorbing glass sheet comprising one or more optical absorbers.

4. A laminated glazing according to claim 3, wherein the first pane of glazing material comprises iron oxide ($Fe_2O_3$).

5. A laminated glazing according to claim 1, wherein the first pane of glazing material comprises a coating on the second major surface thereof.

6. A laminated glazing according to claim 5, wherein the coating on second major surface of the first pane of glazing material comprises at least one light absorbing layer for reducing the intensity of the third reflection.

7. A laminated glazing according to claim 6, wherein the at least one light absorbing layer of the coating on the second major surface of the first pane of glazing material has a thickness between 0.1 nm and 5 nm, and/or wherein the at least one light absorbing layer of the coating on the second major surface of the first pane of glazing material comprises nichrome or an oxide or nitride of nichrome.

8. A laminated glazing according to claim 1, wherein the second pane of glazing material has an iron oxide ($Fe_2O_3$) content between 0.001% and 0.19% by weight $Fe_2O_3$.

9. A laminated glazing according to claim 1, wherein the second pane of glazing material comprises a coating on the first major surface thereof.

10. A laminated glazing according to claim 9, wherein the coating on the first major surface of the second pane of glazing material comprises at least one light absorbing layer for reducing the intensity of the third reflection.

11. A laminated glazing according to claim 10, wherein the at least one light absorbing layer of the coating on the first major surface of the second pane of glazing material comprises nichrome or an oxide or nitride of nichrome.

12. A laminated glazing according to claim 1, wherein the infrared reflecting film comprises at least one layer comprising silver or wherein the infrared reflecting film comprises at least one layer of silver, and/or wherein the infrared reflecting film comprises at least one layer of ZnSnOx, ZnO or ZnO: Al, and/or wherein the infrared reflecting film comprises a first layer comprising silver and a second layer comprising silver, the first layer comprising silver being between a first layer of ZnSnOx, ZnO or ZnO: Al and a second layer of ZnSnOx, ZnO or ZnO: Al, further wherein the second layer comprising silver is between the second layer of ZnSnOx, ZnO or ZnO: Al and a third layer of ZnSnOx, ZnO or ZnO: Al.

13. A laminated glazing according to claim 1, wherein the infrared reflecting film is on the second major surface of the first pane of glazing material or on the first major surface of the second pane of glazing material or wherein the infrared reflecting film is on a carrier ply.

14. A laminated glazing according to claim 1, wherein the second pane of glazing material comprises a clear float glass.

15. A laminated glazing according to claim 1, wherein the thickness of the infrared reflecting film is between 100 nm and 300 nm.

16. A laminated glazing according to claim 1, wherein the infrared reflecting film comprises at least one layer comprising silver or wherein the infrared reflecting film comprises at least one layer of silver, wherein the thickness of the at least one layer is between 1 nm and 20 nm.

* * * * *